(12) United States Patent
Ichiba et al.

(10) Patent No.: US 11,288,159 B2
(45) Date of Patent: Mar. 29, 2022

(54) SYSTEM MODEL EVALUATION SYSTEM, OPERATION MANAGEMENT SYSTEM, SYSTEM MODEL EVALUATION METHOD, AND PROGRAM

(71) Applicants: CHUBU ELECTRIC POWER COMPANY, INC., Nagoya (JP); NEC CORPORATION, Tokyo (JP)

(72) Inventors: Motohiro Ichiba, Nagoya (JP); Hideyuki Ishigami, Nagoya (JP); Takayoshi Asakura, Tokyo (JP); Tomoya Soma, Tokyo (JP); Mayumi Takagi, Tokyo (JP)

(73) Assignees: CHUBU ELECTRIC POWER COMPANY, INC., Nagoya (JP); NEC CORPORATION, Tokyo (JP); JERA CO., INC., Tokyo (JP)

( * ) Notice: Subject to any disclaimer, the term of this patent is extended or adjusted under 35 U.S.C. 154(b) by 793 days.

(21) Appl. No.: 16/304,472

(22) PCT Filed: May 25, 2017

(86) PCT No.: PCT/JP2017/019600
§ 371 (c)(1),
(2) Date: Nov. 26, 2018

(87) PCT Pub. No.: WO2017/204307
PCT Pub. Date: Nov. 30, 2017

(65) Prior Publication Data
US 2019/0220380 A1 Jul. 18, 2019

(30) Foreign Application Priority Data
May 27, 2016 (JP) .............................. JP2016-106077

(51) Int. Cl.
*G06F 11/30* (2006.01)
*G05B 17/02* (2006.01)
(Continued)

(52) U.S. Cl.
CPC .......... *G06F 11/3055* (2013.01); *G05B 17/02* (2013.01); *G05B 23/0243* (2013.01);
(Continued)

(58) Field of Classification Search
None
See application file for complete search history.

(56) References Cited

U.S. PATENT DOCUMENTS

2007/0299642 A1* 12/2007 Kondo ................... G06F 30/20
703/6
2008/0097637 A1* 4/2008 Nguyen ............. G05B 23/0254
700/110
(Continued)

FOREIGN PATENT DOCUMENTS

JP 2009-199533 A 9/2009
JP 2013-073414 A 4/2013
(Continued)

OTHER PUBLICATIONS

Masanao Natsumeda et al., "Invariant Bunseki Gijutsu no Daikibo Butsuri System eno Tekiyo", Journal of Digital Practices [online], Jul. 15, 2015, pp. 207-214, vol. 6, No. 3, ISSN 2188-4390.
(Continued)

*Primary Examiner* — Craig C Dorais
(74) *Attorney, Agent, or Firm* — Sughrue Mion, PLLC

(57) ABSTRACT

There is provided a system model evaluation system including a system model candidate creation part configured to create a candidate(s) of a system model by changing a pattern of selecting an inter-sensor-value relationship created by using sensor values acquired from sensors arranged
(Continued)

in a system to which the system model is directed. This system model evaluation system further includes a system model evaluation part configured to evaluate the candidate(s) of the system model by inputting predetermined evaluation data to the created candidate(s) of the system model.

19 Claims, 22 Drawing Sheets

(51) Int. Cl.
*G06F 11/34* (2006.01)
*G05B 23/02* (2006.01)

(52) U.S. Cl.
CPC .............. *G06F 11/30* (2013.01); *G06F 11/34* (2013.01); *G06F 11/3447* (2013.01)

(56) References Cited

U.S. PATENT DOCUMENTS

| | | |
|---|---|---|
| 2009/0217099 A1 | 8/2009 | Kato |
| 2010/0050025 A1* | 2/2010 | Grichnik ................ G05B 17/02 |
| | | 714/47.2 |
| 2011/0246837 A1 | 10/2011 | Kato |
| 2013/0054031 A1* | 2/2013 | Wilkes ................... G05B 17/02 |
| | | 700/274 |
| 2015/0268072 A1 | 9/2015 | Fujiwara et al. |

FOREIGN PATENT DOCUMENTS

| | | |
|---|---|---|
| JP | 2013-229064 A | 11/2013 |
| JP | 2015-179440 A | 10/2015 |
| JP | 2016-004298 A | 1/2016 |
| WO | 2014/091952 A1 | 6/2014 |

OTHER PUBLICATIONS

International Search Report of PCT/JP2017/019600 dated Aug. 15, 2017 [PCT/ISA/210].

\* cited by examiner

FIG. 4

| SYSTEM | APPARATUS |
|---|---|
| SYSTEM 1 | APPARATUS 1, APPARATUS 2, APPARATUS 3 |
| SYSTEM 2 | APPARATUS 4, APPARATUS 5, APPARATUS 6 |
| . . | . . |

FIG. 5

| APPARATUS | SENSOR |
|---|---|
| APPARATUS 1 | SENSOR s10, SENSOR s11, SENSOR s12 |
| APPARATUS 2 | SENSOR s20, SENSOR s21, SENSOR s22 |
| .. | .. |

FIG. 6

| RULE NUMBER | RULE CONTENT |
|---|---|
| (1) | SENSOR(S) IN TARGET APPARATUS |
| (2) | (1) + SENSOR(S) RELATED TO SENSOR(S) IN TARGET APPARATUS |
| (3) | (2) + ALL SENSORS IN APPARATUS INCLUDING SENSOR(S) RELATED TO SENSOR(S) IN TARGET APPARATUS |
| (4) | (3) + SENSOR(S) RELATED TO SENSORS IN APPARATUS SELECTED IN (3) |
| : | : |
| (X) | ALL CONSTITUENT ELEMENTS IN APPARATUS ES DIRECTLY OR INDIRECTLY RELATED TO TARGET APPARATUS |

EVALUATION METHOD A-2a

FIG. 15

| APPARATUS | SENSOR | APPARATUSES HAVING REDUNDANT CONFIGURATION |
|---|---|---|
| APPARATUS A1 | SENSOR s10, SENSOR s11, SENSOR s12 | APPARATUS A2, APPARATUS A3, APPARATUS A4 |
| APPARATUS B | SENSOR s20, SENSOR s21, SENSOR s22 | N/A |
| APPARATUS C | SENSOR s30, SENSOR s31, SENSOR s32 | N/A |
| .. | .. | .. |

FIG. 17
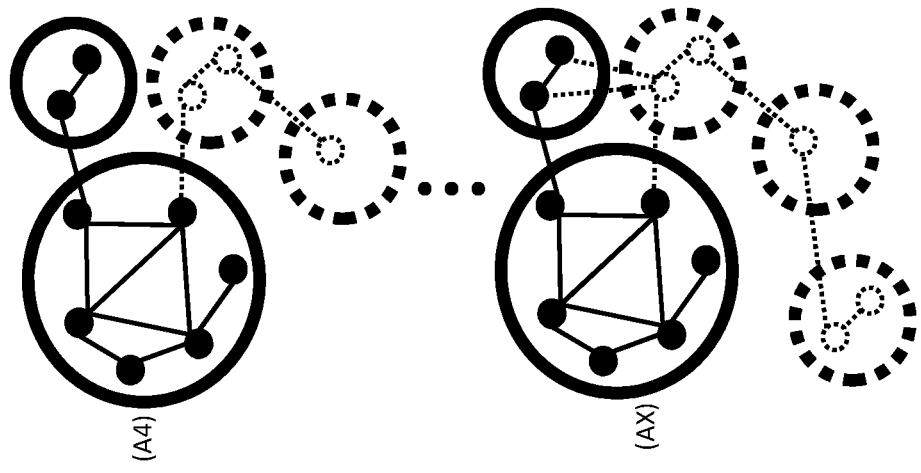
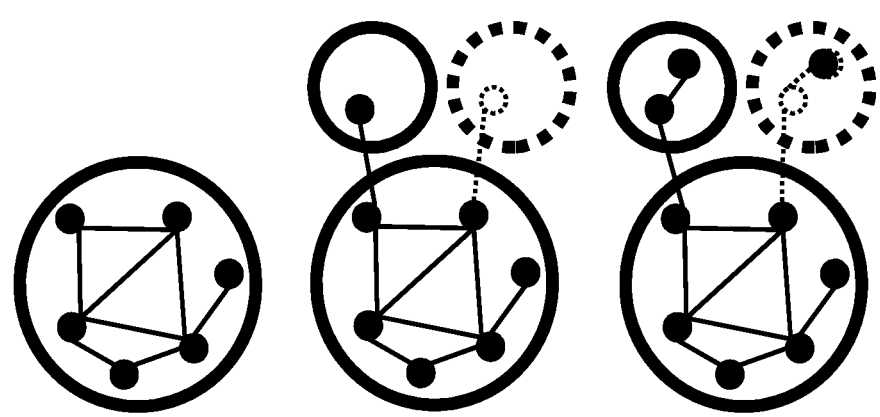
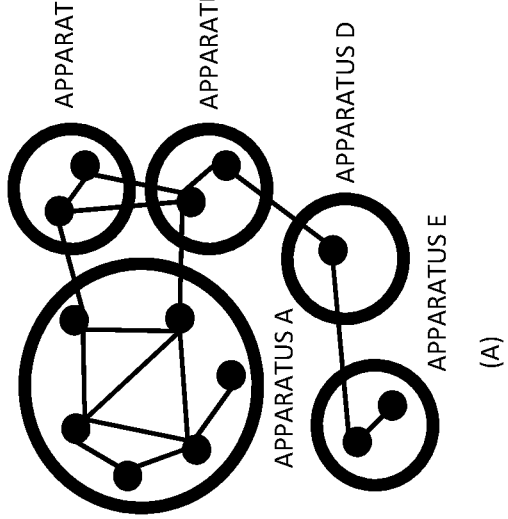

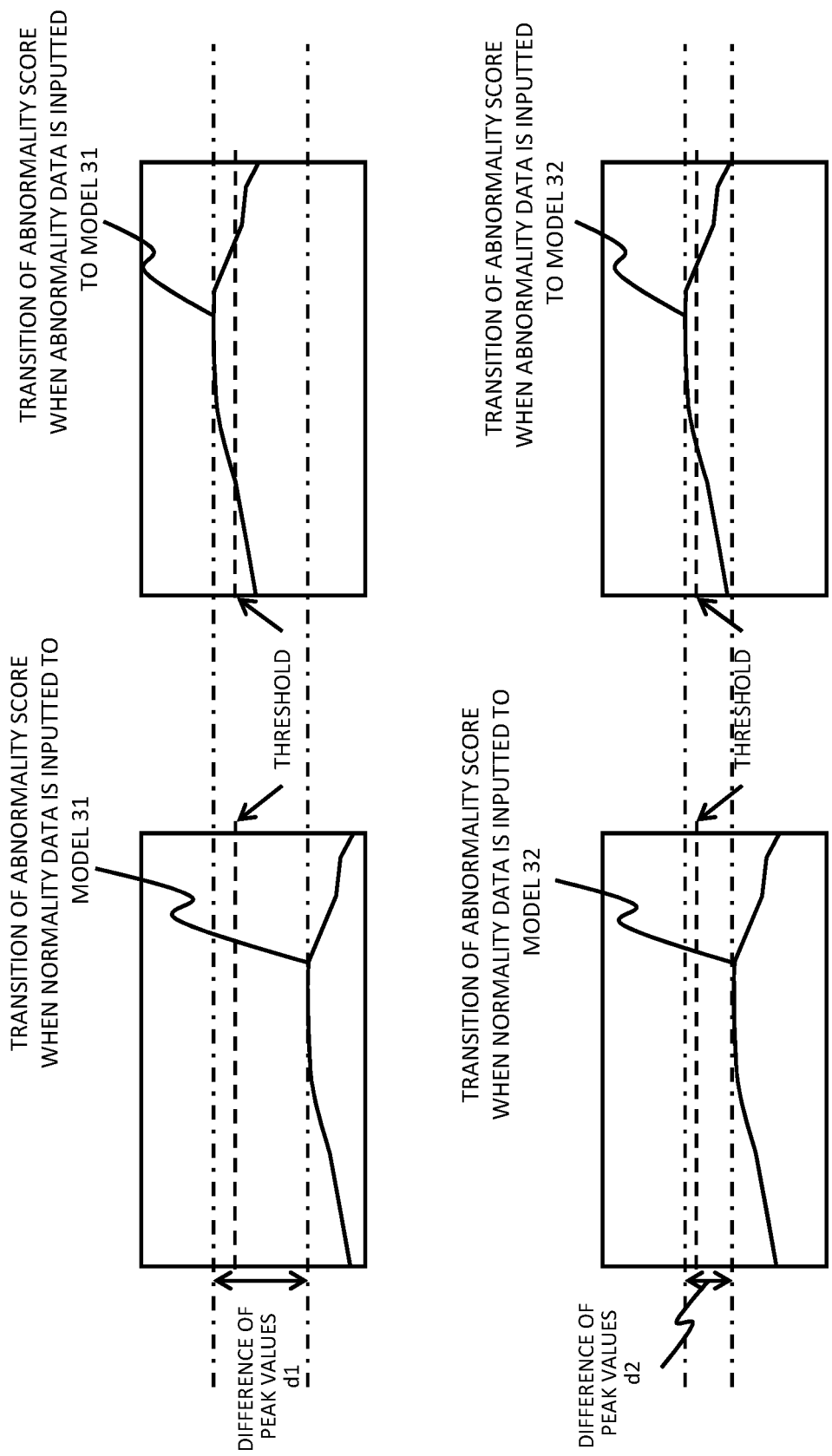

ized as follows. The present invention can contribute to
SYSTEM MODEL EVALUATION SYSTEM, OPERATION MANAGEMENT SYSTEM, SYSTEM MODEL EVALUATION METHOD, AND PROGRAM

CROSS REFERENCE TO RELATED APPLICATIONS

This application is a National Stage of International Application No. PCT/JP2017/019600, filed May 25, 2017, claiming priority based on Japanese Patent Application No. 2016-106077, filed May 27, 2016, the contents of all of which are incorporated herein by reference in their entirety.

FIELD

The present invention relates to a system model evaluation system, an operation management system, a system model evaluation method, and a program. In particular, it relates to: a system model evaluation system which establishes a system model(s) used for analyzing a system failure(s), detecting a sign(s) of a malfunction(s), or the like; an operation management system; a system model evaluation method; and a program.

BACKGROUND

Patent Literature 1 discloses an operation management apparatus which can detect signs of malfunctions of management target apparatuses included in a system and determine the locations of the malfunctions. Specifically, this operation management apparatus uses performance items or management target apparatuses as elements and includes at least a correlation model generation part 123 which derives a correlation function between first performance time-series information that indicates time-series change of performance information about a first element and second performance time-series information that indicates time-series change of performance information about a second element, generates a correlation model based on this correlation function, and calculates such correlation models for combinations of various elements; and a correlation change analysis part 124 which analyzes changes of the correlation models based on performance information newly detected and acquired from the management target apparatuses.

Patent Literature 2 discloses a method for detecting abnormalities. In this method, the above correlation models are created in association with calendar attributes such as weekdays and holidays.

Patent Literature 3 discloses a system for detecting various kinds of abnormalities. According to this system, abnormalities of pumps inside a power plant are detected by using the above models.
Patent Literature 1
   Japanese Patent Kokai Publication No. JP2009-199533A
Patent Literature 2
   Japanese Patent Kokai Publication No. JP2013-229064A
Patent Literature 3
   Japanese Patent Kokai Publication No. JP2016-4298A

SUMMARY

The following analysis has been given by the present inventors. The systems described in the above Patent Literatures 1 to 3 adopt an approach in which a system model is created by using sensor values indicating operation data (these sensor values are referred to as "performance information" in Patent Literatures 1 and 2). For this reason, Patent Literatures 1 to 3 claim that their systems can create an accurate system model by taking, for example, the degree of deterioration or abrasion of an individual element included in a target system into consideration.

It is needless to say that highly accurate analysis needs to be performed in monitoring an important system. To perform highly accurate analysis, establishment of a model (a system model) that enables abnormality detection highly accurately is needed.

It is an object of the present invention to provide a system model evaluation system, an operation management system, a system model evaluation method, and a program that can contribute to easy establishment of a highly accurate system model.

According to a first aspect, there is provided a system model evaluation system including a system model candidate creation part configured to create a candidate(s) of a system model by changing a pattern of selecting an inter-sensor-value relationship created by using sensor values acquired from sensors arranged in a system to which the system model is directed. This system model evaluation system further includes a system model evaluation part configured to evaluate the candidate(s) of the system model by inputting predetermined evaluation data to the created candidate(s) of the system model.

According to a second aspect, there is provided an operation management system that performs operation management on a target system by using a system model evaluated by the above system model evaluation system.

According to a third aspect, there is provided a system model evaluation method, including: creating a candidate(s) of a system model by changing a pattern of selecting an inter-sensor-value relationship created by using sensor value(s) acquired from sensor(s) arranged in a system to which the system model is directed; and evaluating the candidate(s) of the system model by inputting predetermined evaluation data to the created candidate(s) of the system model. This method is associated with a certain machine, which is a computer including the above system model creation part and evaluation part.

According to a fourth aspect, there is provided a program, causing a computer, which includes a system model storage part that stores a system model configured by an inter-sensor-value relationship created by using data acquired from sensor(s) arranged in a system to which a system model is directed, to perform processing for: creating a candidate(s) of the system model by changing a pattern of selecting an inter-sensor-value relationship created by using sensor value(s) acquired from sensor(s) arranged in the system to which the system model is directed; and evaluating the candidate(s) of the system model by inputting predetermined evaluation data to the created candidate(s) of the system model. This program can be stored in a computer-readable (non-transient) storage medium. Namely, the present invention can be embodied as a computer program product.

Advantageous Effects of Invention

The meritorious effects of the present invention are summarized as follows. The present invention can contribute to improvement in accuracy of a system model used in operation management of a system. Namely, the present invention can convert the system model evaluation systems described in Background into a system model evaluation system whose prediction accuracy or the like has been significantly improved.

BRIEF DESCRIPTION OF THE DRAWINGS

FIG. 4 illustrates an example of system information held in a system model evaluation system according to the first exemplary embodiment of the present disclosure.

FIG. 5 illustrates an example of apparatus information held in the system model evaluation system according to the first exemplary embodiment of the present disclosure.

FIG. 6 illustrates an example of candidate generation rules held in the system model evaluation system according to the first exemplary embodiment of the present disclosure.

FIG. 15 illustrates an example of apparatus information held in the system model evaluation system according to the second exemplary embodiment of the present disclosure.

FIG. 17 illustrates an example of system model candidates generated by the system model evaluation system according to the third exemplary embodiment of the present disclosure.

FIG. 22 illustrates a system model candidate evaluation method used by the system model evaluation system according to the fifth exemplary embodiment of the present disclosure.

PREFERRED MODES

Figure 1:
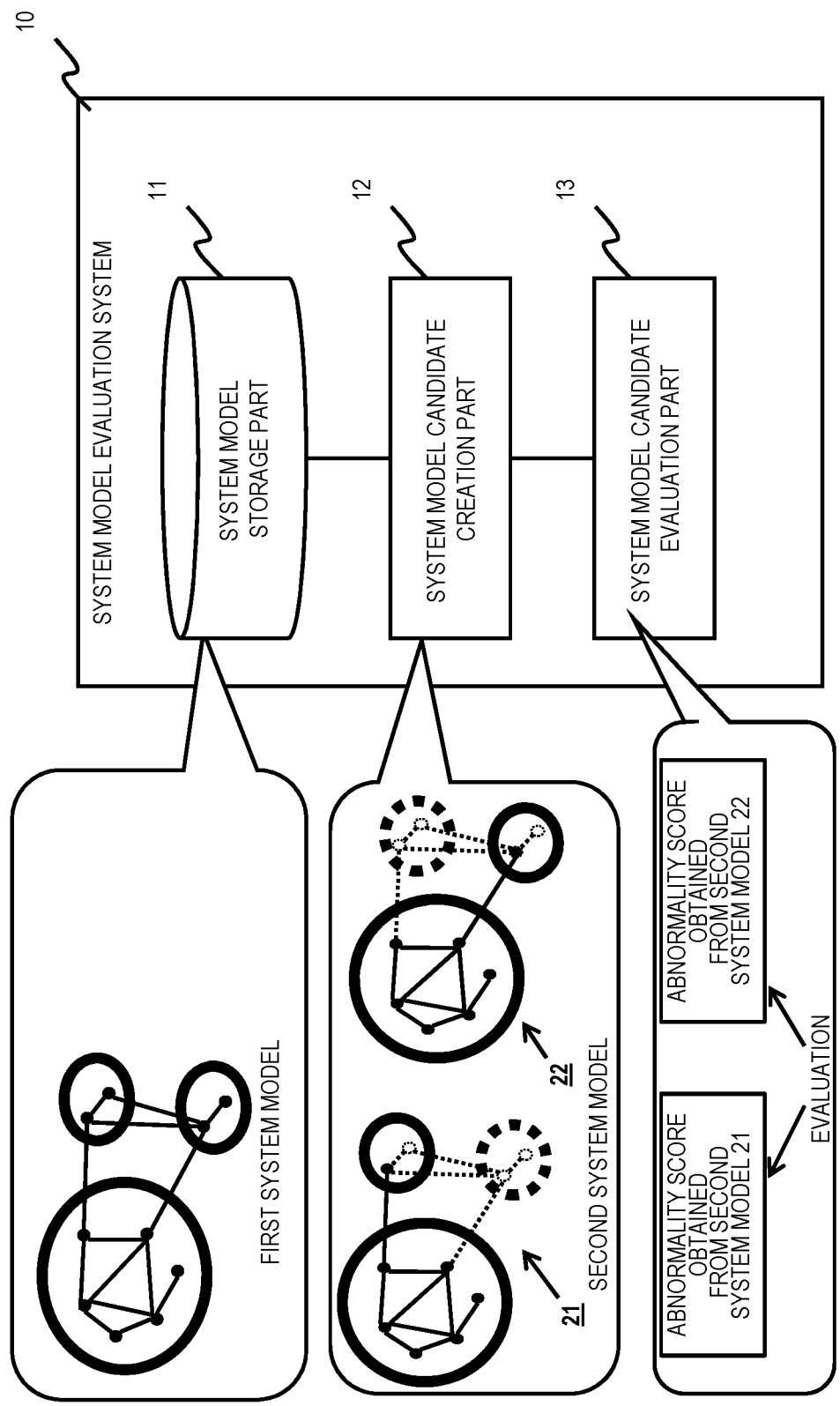
FIG. 1 illustrates an exemplary embodiment of the present disclosure.

First, an outline of an exemplary embodiment of the present disclosure will be described with reference to a drawing. Reference characters in the following outline denote various elements for the sake of convenience and are used as examples to facilitate understanding of the present disclosure. Namely, the reference characters are not intended to limit the present disclosure to the illustrated modes. An individual connection line between blocks in any of the drawings used in the following description signifies both one-way and two-way directions. An individual arrow schematically illustrates the principal flow of a signal (data) and does not exclude bidirectionality.

As illustrated in FIG. 1, an exemplary embodiment of the present disclosure can be realized by a system model evaluation system 10 including: a system model storage part 11 storing a first system model (a master model) configured by an inter-sensor-value relationship created by using sensor values acquired from sensors arranged in a system to which a system model is directed; system model candidate creation part 12; and system model candidate evaluation part 13.

More specifically, the system model candidate creation part 12 creates a candidate(s) of a second system model by changing a pattern of selecting an inter-sensor-value relationship constituting the first system model (see a balloon in FIG. 1). For example, in the example in FIG. 1, as illustrated inside a balloon, system model candidates 21 and 22 have been created as the candidates of the second system model.

The system model candidate evaluation part 13 evaluates the candidates of the second system model by inputting predetermined evaluation data to the created candidates of the second system model. For example, as the evaluation data, the system model candidate evaluation part 13 inputs time-series data of sensor values obtained when there is actually an abnormality. Consequently, the second system model can be evaluated in view of whether a value obtained from the second system model has exceeded a predetermined threshold, namely, whether the second system model has detected the "abnormality". In contrast, as the evaluation data, the system model candidate evaluation part 13 may input time-series data of sensor values obtained when there is no abnormality. Consequently, the second system model can be evaluated in view of whether a value obtained from the second system model has exceeded a predetermined threshold, namely, whether the second system model has not erroneously detected "normality" to be "abnormality".

According to the system model evaluation system configured as described above, it is possible to obtain a system model (a second system model having a high evaluation level) that is less affected by noise or the like. This is because the exemplary embodiment adopts the configuration in which the system model candidate creation part 12 creates a candidate(s) of the (second) system model by changing a pattern of selecting an inter-sensor-value relationship and evaluates the candidate(s). Namely, in one aspect, it is fair to say that the present disclosure removes an inter-sensor-value relationship(s), which can be a cause of noise, from the comprehensive first system model created by using data acquired from the sensors in the target system and creates a candidate(s) of a system model having improved characteristics.

First Exemplary Embodiment

Figure 2:
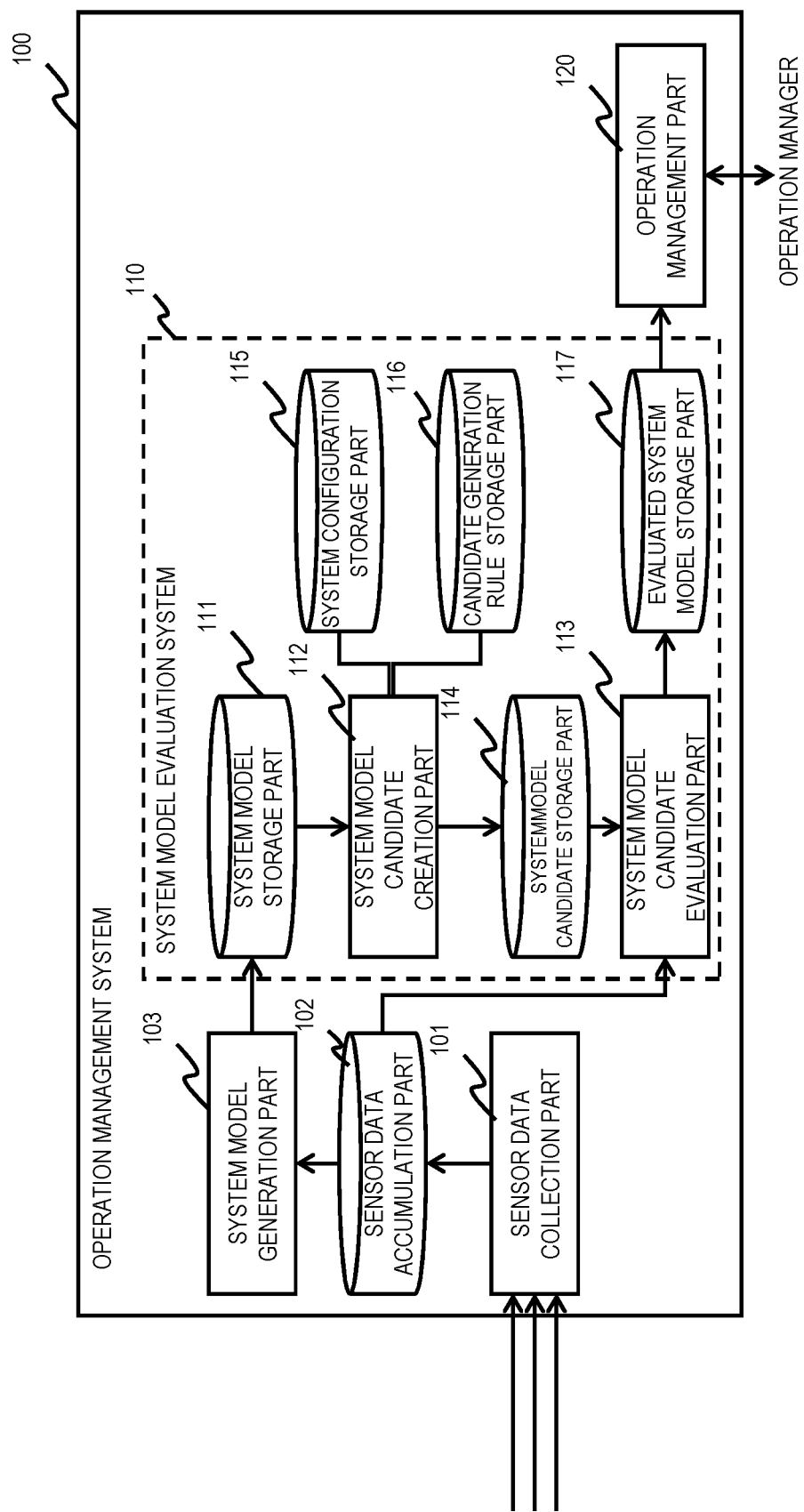
FIG. 2 illustrates a configuration of an operation management system according to a first exemplary embodiment of the present disclosure.

Next, a first exemplary embodiment of the present disclosure will be described in detail with reference to drawings. FIG. 2 illustrates a configuration of an operation management system according to the first exemplary embodiment of the present disclosure. FIG. 2 illustrates an operation management system 100 including a system model evaluation system 110.

The operation management system 100 includes a sensor data collection part 101, a sensor data accumulation part 102, a system model generation part 103 which provides the system model evaluation system 110 with a system model, and an operation management part 120 which performs operation management on a management target system by using a system model (a second system model) evaluated by the system model evaluation system 110.

The sensor data collection part 101 collects sensor data of various kinds of sensors included in the management target system and accumulates the sensor data in the sensor data accumulation part 102. The sensor data collection part 101 collects data from various kinds of sensors in an arbitrary manner. For example, the sensor data collection part 101 may directly receive sensor data from sensors or IoT (Internet of Things) terminals or the like connected to sensors. The sensor data collection part 101 may acquire necessary sensor data from a server(s) arranged in a cloud system or the like.

The sensor data accumulation part 102 is configured as a database or the like that holds data collected by the sensor data collection part 101 as respective time-series data.

Figure 3:
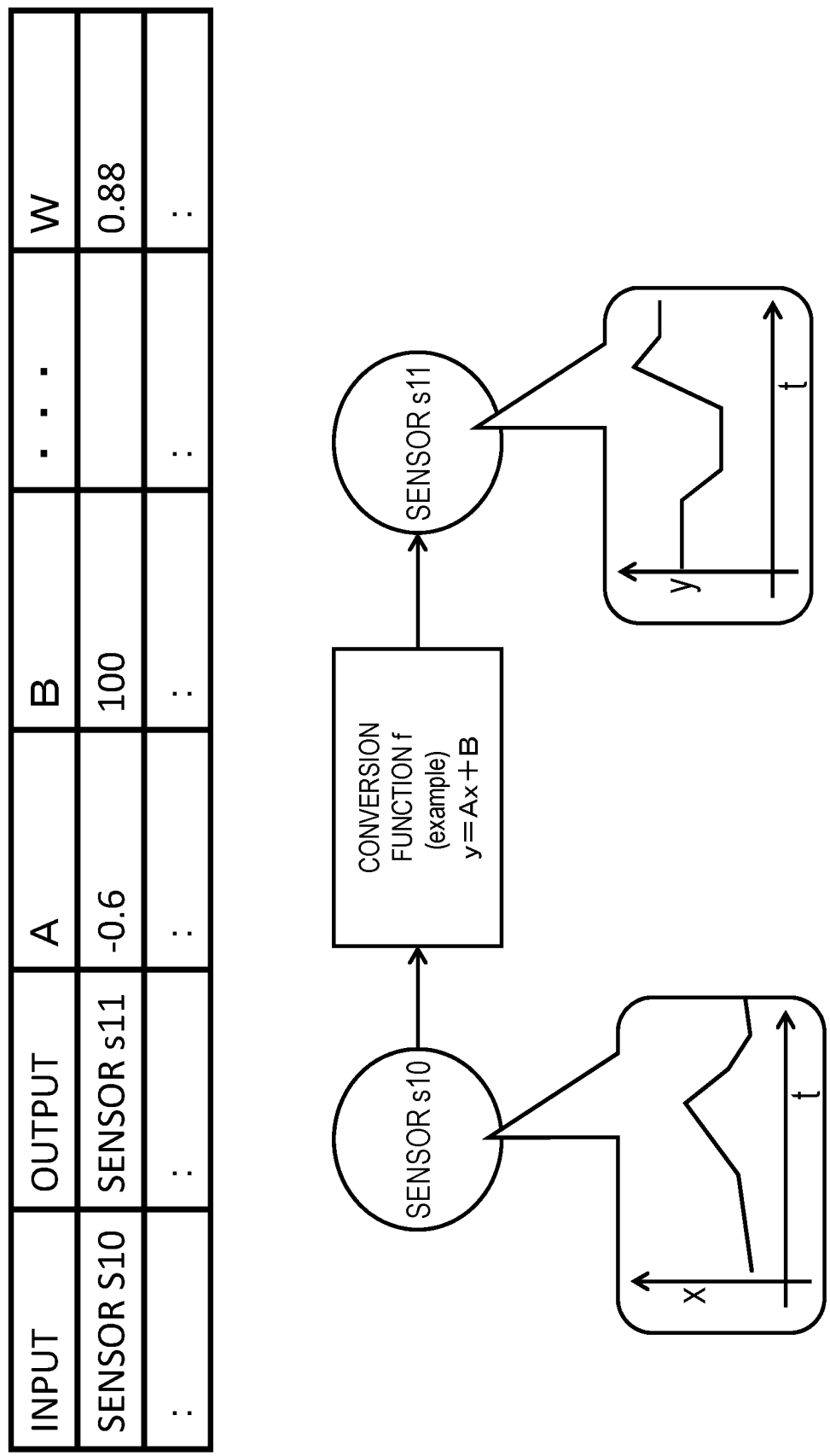
FIG. 3 illustrates an inter-sensor-value relationship used in the operation management system according to the first exemplary embodiment of the present disclosure.

The system model generation part 103 generates a system model by using the sensor data accumulated in the sensor data accumulation part 102. For example, as illustrated in FIG. 3, by deriving a conversion function $f$ of using time-series data of a certain sensor s10 as an input and time-series data of a second sensor s11 as an output, a relationship between the sensors s10 and s11 is obtained. In addition, when there is a difference between a value obtained by the conversion function $f$ and actual time-series data, as needed, weight information or reliability information as illustrated in FIG. 3 may be calculated, and the calculated information may be stored along with the conversion function. The system model generation part 103 generates a system model (hereinafter referred to as "a first system model" and "a master model") that models a behavior of the management target system, by repeating the above processing on an individual combination of sensors used for the modeling. The generated system model is stored in a system model storage part 111. When generating the system model, the system model generation part 103 may use any of the methods described in Patent Literatures 1 to 3 as needed.

The operation management part 120 performs operation management on the management target system by using a system model evaluated by the system model evaluation system 110. As needed, the operation management part 120 notifies an operation manager of a sign of a malfunction, a location where a malfunction could occur, etc.

Next, specific parts in the system model evaluation system indicated within a dashed line in FIG. 2 will be described. The system model evaluation system 110 includes the system model storage part 111, a system model candidate creation part 112, a system model candidate evaluation part 113, a system model candidate storage part 114, a system configuration storage part 115, a candidate generation rule storage part 116, and an evaluated-system-model storage part 117.

The system configuration storage part 115 stores configuration information about the management target system. FIG. 4 illustrates an example of a table holding information about apparatuses included in an individual system. FIG. 5 illustrates an example of a table holding information about sensors arranged in an individual apparatus. By referring to the tables in FIGS. 4 and 5, it is possible to grasp the apparatuses included in a certain system and the sensors arranged in an individual one of the apparatuses. While not illustrated in the examples in FIGS. 4 and 5, an individual connection relationship between apparatuses or sensors may be held as the system configuration information. The examples in FIGS. 4 and 5 assume two configuration levels, which are a system configuration and an apparatus configuration. However, for example, configuration information indicating that an apparatus(es) forms a facility, a facility(ies) forms a channel, and a channel(s) forms a whole system is also applicable.

The candidate generation rule storage part 116 stores rules (candidate generation rules) for creating candidates of the second system model used for operation management from the system model held in the system model storage part 111. FIG. 6 illustrates an example of candidate generation rules.

The system model candidate creation part 112 creates the candidates of the system model as the evaluation targets (the candidates of the second system model) by using the system model held in the system model storage part 111, the system configuration information held in the system configuration storage part 115, and the rules (candidate generation rules) held in the candidate generation rule storage part 116. The candidates of the system model (the candidates of the second system model) created by the system model candidate creation part 112 are stored in the system model candidate storage part 114.

FIG. 6 illustrates an example of system model candidate creation rules held in the candidate generation rule storage part 116. In the example in FIG. 6, rules (1) to (X) are set. In accordance with these rules (1) to (X), the number of sensors and the number of apparatuses included in the corresponding candidates of the system model are gradually increased. For example, when the rules illustrated in FIG. 6 are used, the system model candidate creation part 112 creates system model candidates having the following variations.

Figure 7:
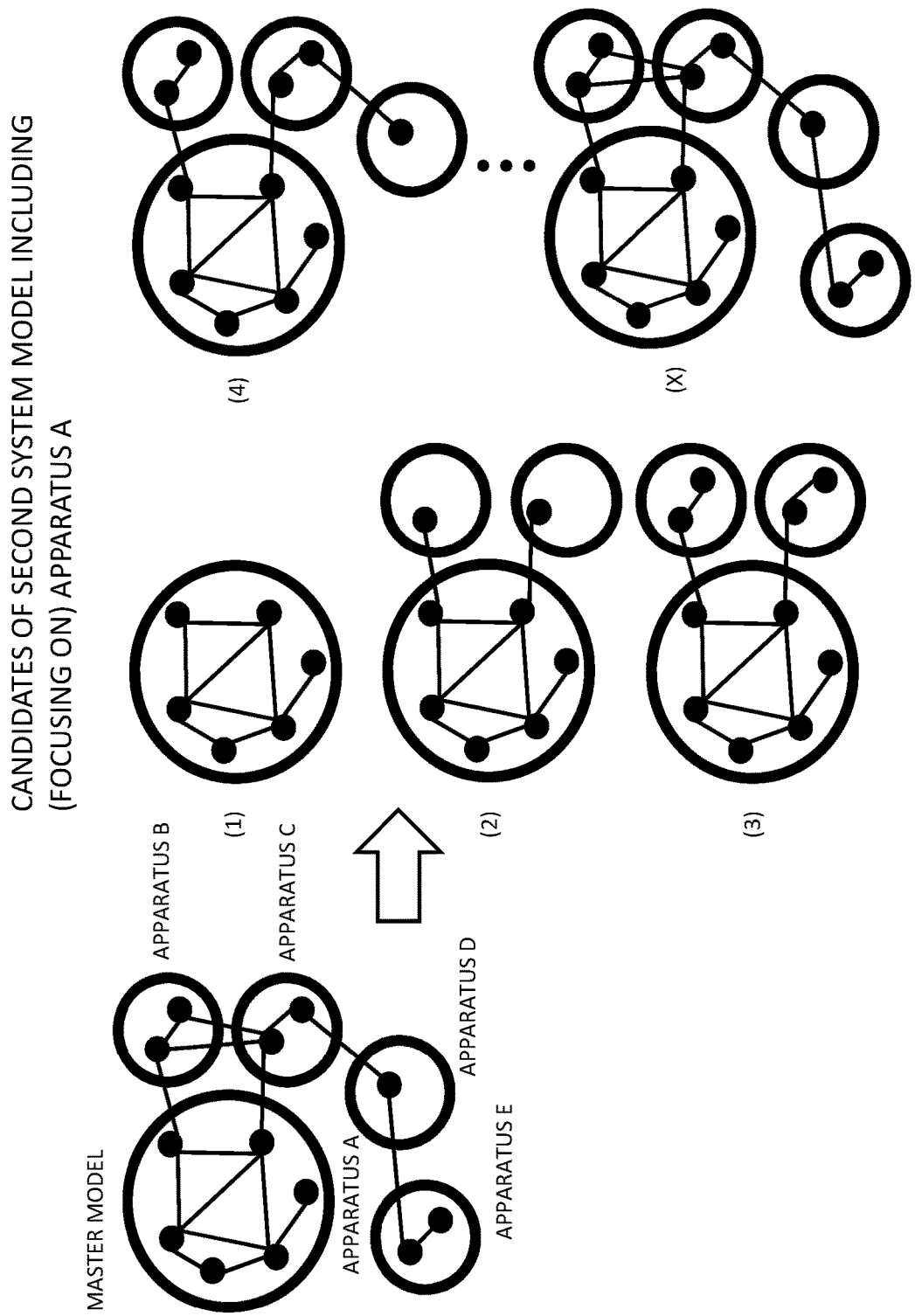
FIG. 7 illustrates an example of system model candidates generated by the system model evaluation system according to the first exemplary embodiment of the present disclosure.

(1) The system model candidate creation part 112 selects an apparatus included in a certain system and creates a candidate of the system model by using a relationship among the sensors arranged in the selected apparatus (see (1) in FIG. 7).
(2) The system model candidate creation part 112 selects sensors related to sensors in the apparatus selected in (1) and creates a candidate of the system model by using a relationship among these sensors (see (2) in FIG. 7). The presence or absence of a relationship between sensors can be determined based on whether the apparatuses including the sensors are connected to each other and whether values monitored by respective sensors focused have an input-output relationship. Alternatively, even when these values do not have a direct input-output relationship, if a certain correlation is recognized between monitoring items, the presence of a relationship between the sensors may be determined.

(3) The system model candidate creation part 112 creates a candidate of the system model by using, in addition to the relationships among the sensors selected in (1) and (2), relationships among sensors included in the apparatuses selected in (2) (see (3) in FIG. 7).

(4) In addition to the relationships among the sensors selected in (1) to (3), the system model candidate creation part 112 selects a sensor related to a sensor in the apparatus selected in (3) and creates a candidate of the system model by using a relationship between these sensors (see (4) in FIG. 7). Likewise, the system model candidate creation part 112 creates a candidate of the system model by using a relationship between sensors included in an apparatus other than the apparatus selected in (1), in addition to the relationships among the sensors selected in (1) to (4).

(X) Finally, the system model candidate creation part 112 may create a candidate of the system model including all the constituent elements in the apparatuses having a direct or indirect relationship with the target apparatus (See (X) in FIG. 7). Of course, alternatively, the system model candidate creation part 112 may stop the system model candidate creation processing when the system model candidate creation part 112 has selected another sensor related to a sensor of the apparatus selected in (4) and has created a candidate of the system model by using a relationship between these sensors.

By repeating the above processing on the target apparatus, the candidates of the second system model that need to be evaluated are obtained. The rules (candidate generation rules) for creating the candidates of the second system model are not limited to the above example. Other examples of these rules will be described below as third and fourth exemplary embodiments.

The system model candidate evaluation part 113 extracts a candidate of the system model (a candidate of the second system model) from the system model candidate storage part 114 and evaluates the candidate of the system model (the candidate of the second system model) by inputting predetermined evaluation data and calculating an evaluation value representing validity of the output from the candidate. The candidate of the system model (the candidate of the second system model) evaluated by the system model candidate evaluation part 113 is stored in the evaluated-system-model storage part 117 as an evaluated-system-model candidate.

In the example in FIG. 2, the system model evaluation system 110 is included in the operation management system 100. However, the operation management system 100 and the system model evaluation system 110 may be realized as physically or logically separated apparatuses. In addition, an individual part (processing part) of the system model evaluation system and the operation management system may be realized by a computer program which causes a computer constituting the corresponding system to use its hardware and execute the corresponding processing described above.

Figure 8:
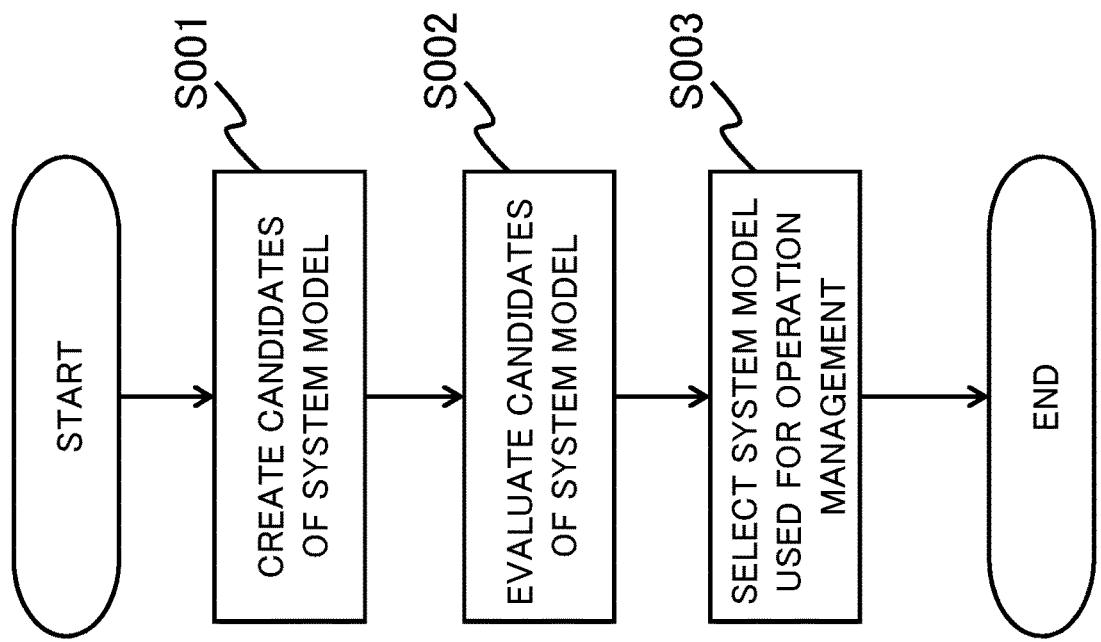
FIG. 8 illustrates an operation of the system model evaluation system according to the first exemplary embodiment of the present disclosure.

Next, an operation of the above system model evaluation system 110 will be described in detail with reference to drawings. FIG. 8 illustrates an operation of the system model evaluation system according to the first exemplary embodiment of the present disclosure. As illustrated in FIG. 8, when a predetermined event occurs, the system model evaluation system 110 creates candidates of the system model (candidates of the second system model) as the evaluation targets by using the system model held in the system model storage part 111, the system configuration, and the above rules (candidate generation rules) (step S001).

Next, the system model evaluation system 110 evaluates the candidates of the system model (the candidates of the second system model) generated in step S001 (step S002).

Finally, the system model evaluation system 110 selects a system model (a second system model) used for operation management from the candidates of the system model (candidates of the second system model) evaluated in step S002 (step S003). The system model (second system model) selected in this step will be used by the operation management part 120 when performing operation management on the target system.

Figure 20:
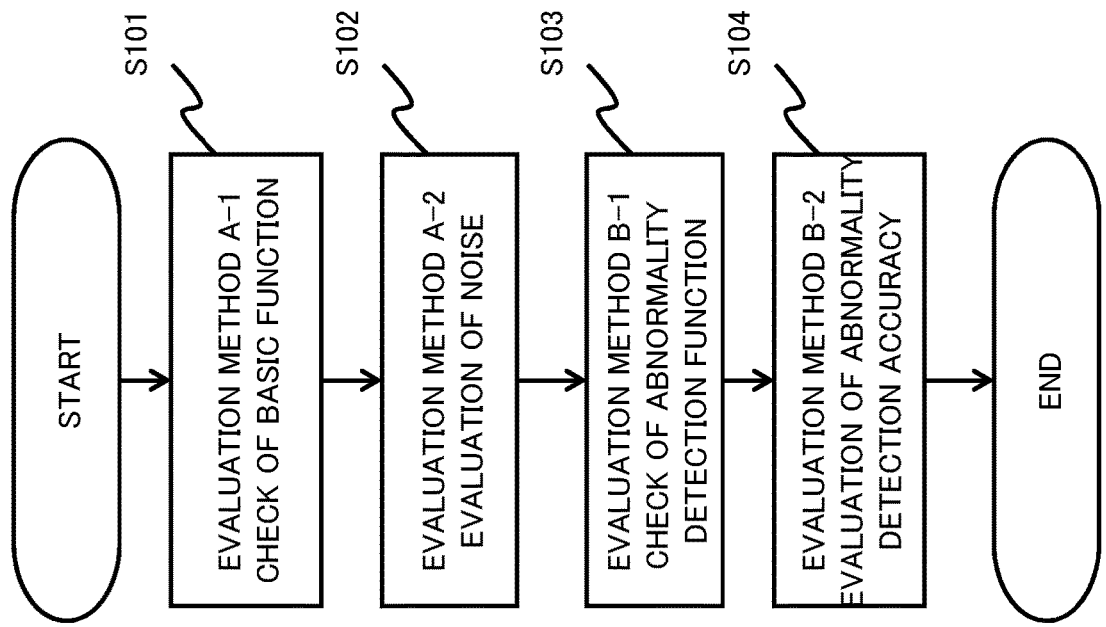
FIG. 20 illustrates an example of the processing flow of the evaluation of the system model candidates in FIG. 8.

Hereinafter, the evaluation method in the above step S002 will be described. FIG. 20 illustrates an example of the processing flow of the evaluation of the system model candidates in FIG. 8. As illustrated in FIG. 20, step S002 in FIG. 8 includes 4 steps of an evaluation method A-1 (step S101; check of basic function), an evaluation method A-2 (step S102; evaluation of noise), an evaluation method B-1 (step S103; check of abnormality detection function), and an evaluation method B-2 (step S104; evaluation of abnormality detection accuracy). An individual step may be omitted arbitrarily. An individual step may be replaced by an arbitrarily extended concept. "Normality data" is evaluation data which has been created by using data obtained when there is no abnormality in the corresponding system. "Abnormality data" is evaluation data which has been created by using data obtained when there is an abnormality in the corresponding system.

The evaluation method A-1 (step S101; check of basic function) is a step of inputting normality data to an individual one of the candidates of the second system model and checks whether an individual candidate has a basic function of, for example, determining the normality data to be normal based on whether an obtained abnormality score exceeds a first threshold.

The evaluation method A-2 (step S102; evaluation of noise) is a step of inputting normality data to an individual one of the candidates of the second system model and determining the size of the noise of the obtained abnormality score.

The evaluation method B-1 (step S103; check of abnormality detection function) is a step of inputting abnormality data to an individual one of the candidates of the second system model and checking whether an individual candidate has an abnormality detection function based on whether the obtained abnormality score exceeds a second threshold.

The evaluation method B-2 (step S104; evaluation of abnormality detection accuracy) is a step of inputting abnormality data to an individual one of the candidates of the second system model and evaluating, if an abnormality is detected, the accuracy of the abnormality detection by using the difference between the time when the abnormality has been detected and the time when the abnormality has actually occurred.

Hereinafter, the evaluation method in the above step S002 will be described by using specific examples. The following description will be made assuming that the system model evaluation system 110 has created six candidates of the second system model (which will be referred to as second system models 21 to 26) as the candidates of the system model (the candidates of the second system model).

Figure 9:
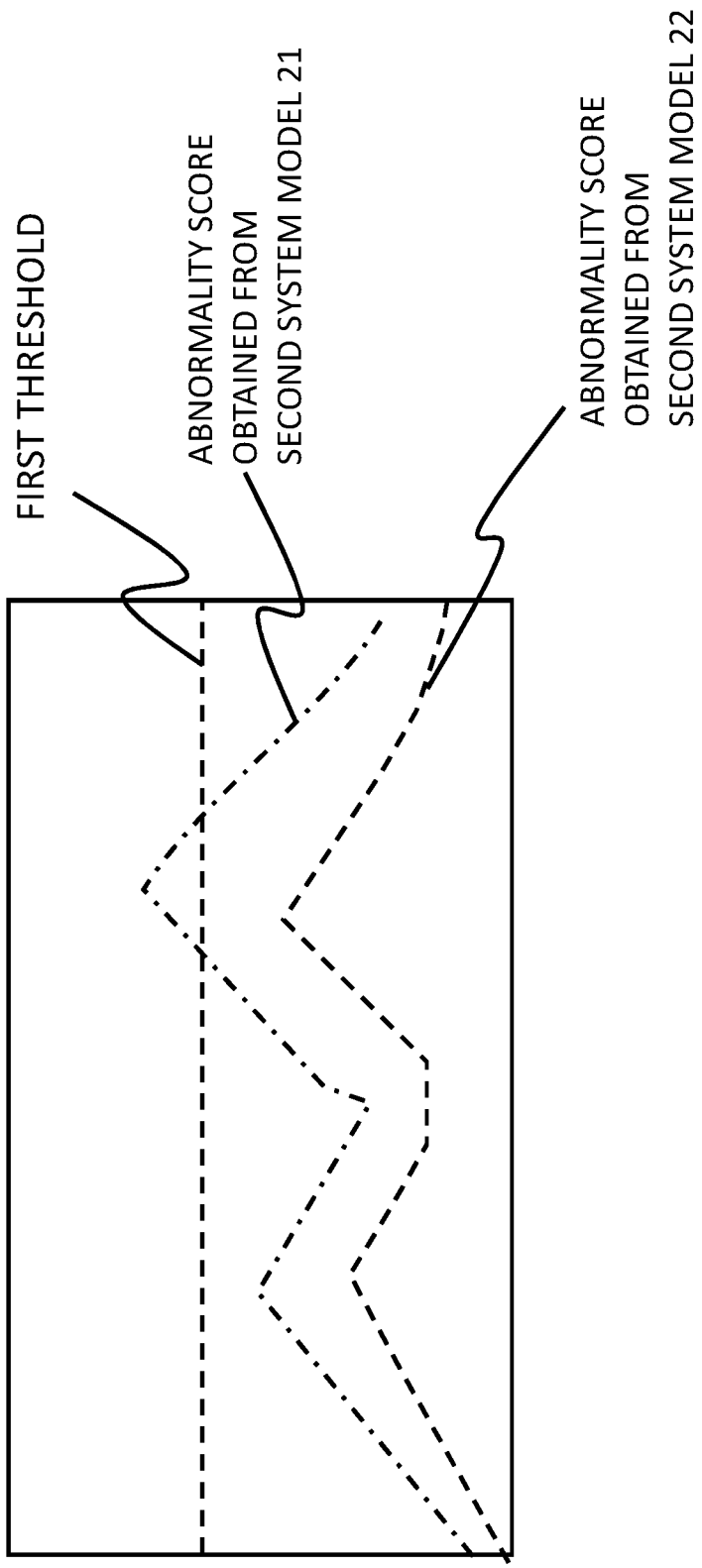
FIG. 9 illustrates an example of a system model candidate evaluation method used by the system model evaluation system according to the first exemplary embodiment of the present disclosure.

First, the system model candidate evaluation part 113 needs to input normality data to an individual one of the candidates of the system model and check whether an individual candidate can determine whether the normality data to be "normal" accurately. FIG. 9 illustrates a specific example of the evaluation method A-1. Specifically, FIG. 9 illustrates change of abnormality scores obtained by inputting normality data to the second system models 21 and 22 and using a predetermined monitoring item. In the example in FIG. 9, although the normality data has been inputted to the second system model 21, the corresponding abnormality score has exceeded the first threshold. Thus, the second system model 21 is determined to be inappropriate (an erroneous determination). In contrast, since the abnormality score of the second system model 22 has not exceeded the first threshold, the second system model 22 is determined to be appropriate. While not illustrated in FIG. 9, the evaluation method A-1 on the second system models 23 to 26 is also performed in the same way.

Figure 10:
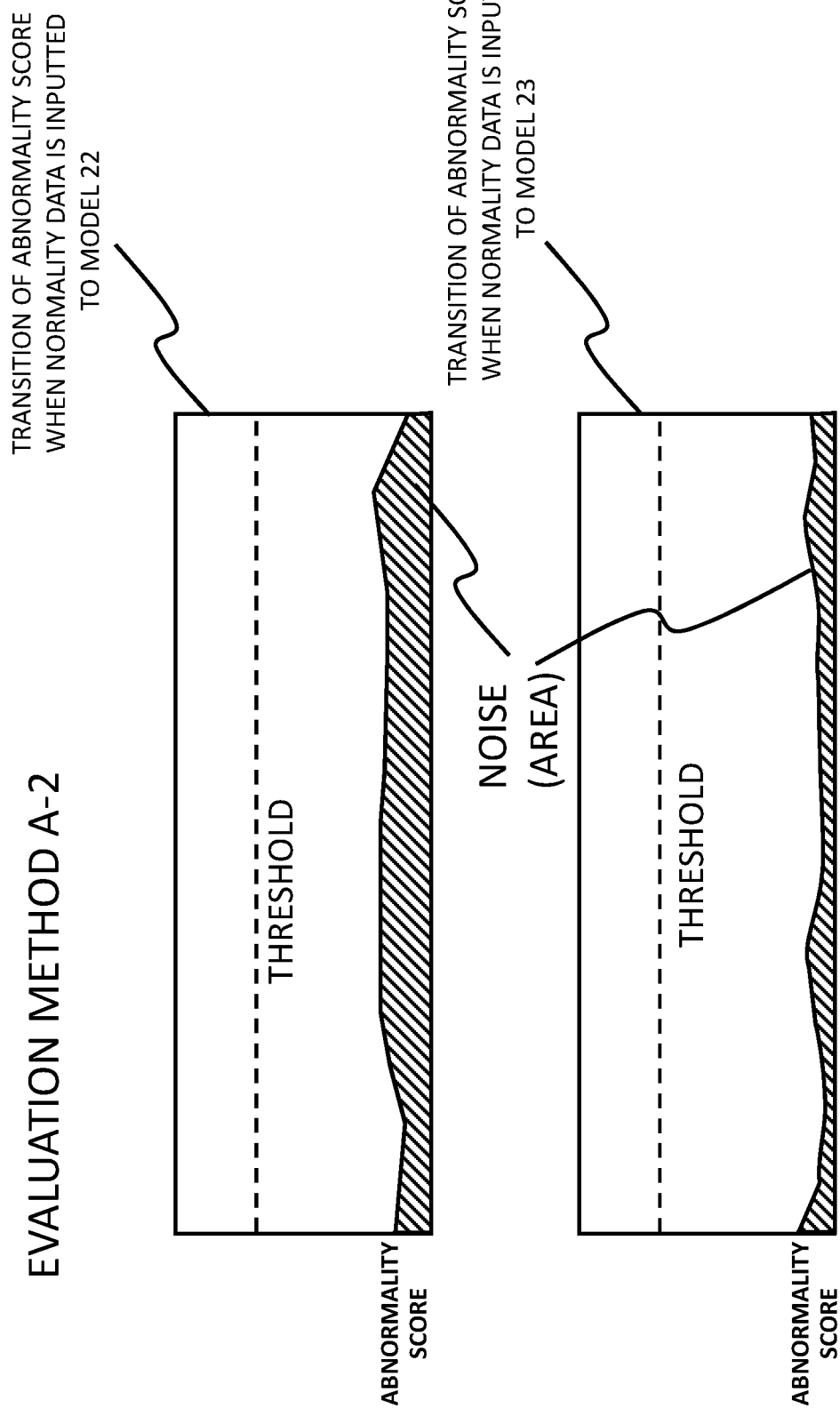
FIG. 10 illustrates an example of a system model candidate evaluation method used by the system model evaluation system according to the first exemplary embodiment of the present disclosure.

Next, the system model candidate evaluation part 113 calculates an evaluation value for an individual one of the second system models that have not made an erroneous determination on the above normality data and determines the second system model corresponding to the best evaluation value. FIG. 10 illustrates a specific example of the evaluation method A-2. Specifically, FIG. 10 illustrates change of abnormality scores obtained by inputting the normality data to the second system models 22 and 23 and using a predetermined monitoring item. In the shaded area at the bottom part in each graph in FIG. 10 represents noise. A better second system model represents smaller noise. This is because a better second system model has a larger margin. A larger margin signifies a higher probability that the corresponding second system model can determine normality data to be normal. In the example in FIG. 10, when the second system models 22 and 23 are compared with each other, the second system model 22 has a larger shaded area. In this case, the second system model 23 has less noise than the second system model 22. Likewise, for each of the system models 24 to 26, the system model candidate evaluation part 113 calculates a shaded area indicating noise and uses the shaded area as the evaluation value of the corresponding candidate of the system model (a better candidate has a smaller shaded area). An evaluation value may be calculated by using information other than the above shaded area. For example, abnormality level averages may be calculated and compared with each other. Alternatively, abnormality level maximum values may be calculated and compared with each other.

Figure 11:
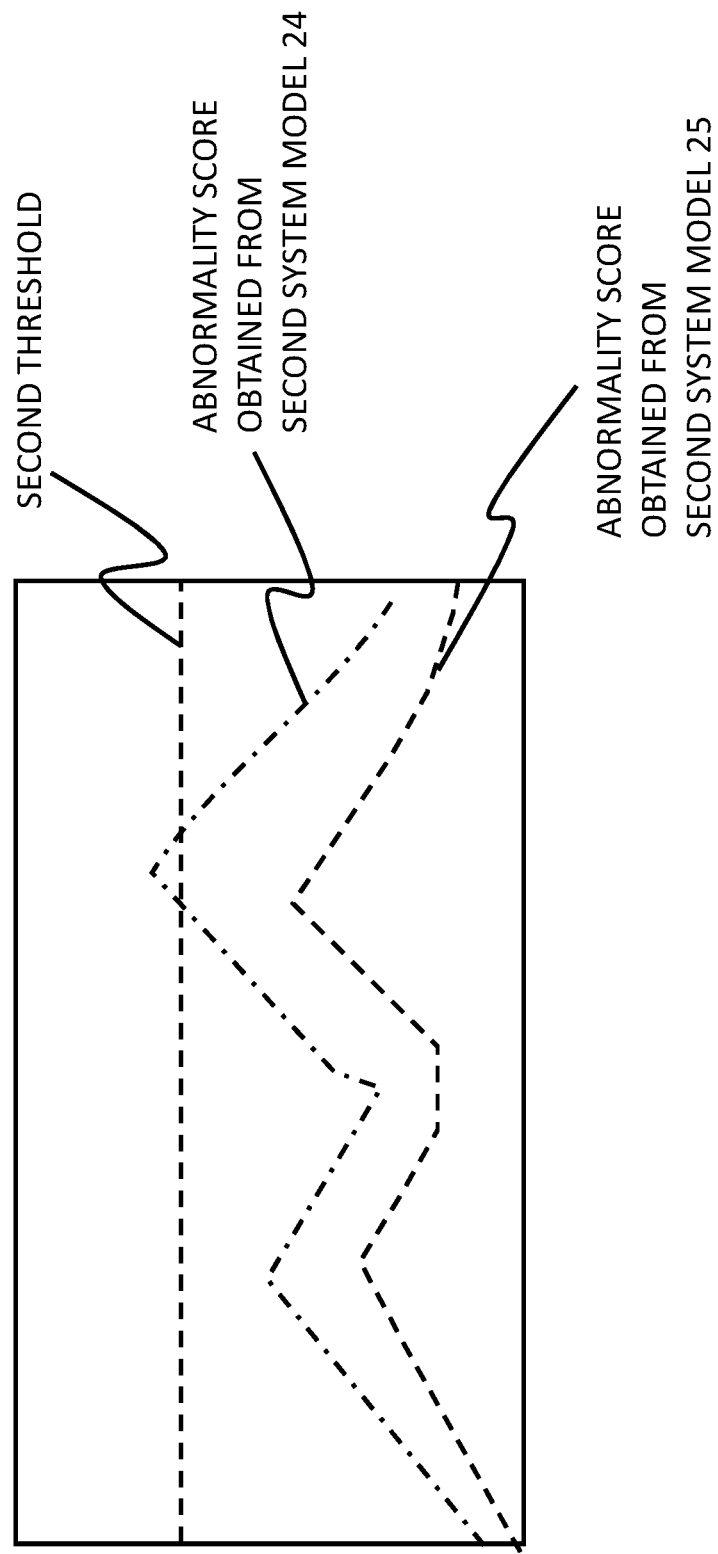
FIG. 11 illustrates an example of a system model candidate evaluation method used by the system model evaluation system according to the first exemplary embodiment of the present disclosure.

The following description will be made on a method in which the system model candidate evaluation part 113 inputs abnormality data obtained when there is an abnormality to an individual one of the candidates of the system model and checks whether or not an individual candidate can determine the abnormality data to be "abnormal" at appropriate timing. FIG. 11 illustrates a specific example of the evaluation method B-1. Specifically, FIG. 11 illustrates change of abnormality scores obtained by inputting abnormality data to the second system models 24 and 25 and using a predetermined monitoring item. In the example in FIG. 11, although the abnormality data has been inputted to the second system model 25, the abnormality score has not exceeded the second threshold. Thus, the second system model 25 is determined to be an inappropriate system model that cannot detect the abnormality. In contrast, the second system model 24 is determined to be appropriate, since the abnormality score has exceeded the second threshold. While not illustrated in FIG. 11, the evaluation method B-1 on the second system models 22, 23, and 26 is also performed in the same way.

Figure 12:
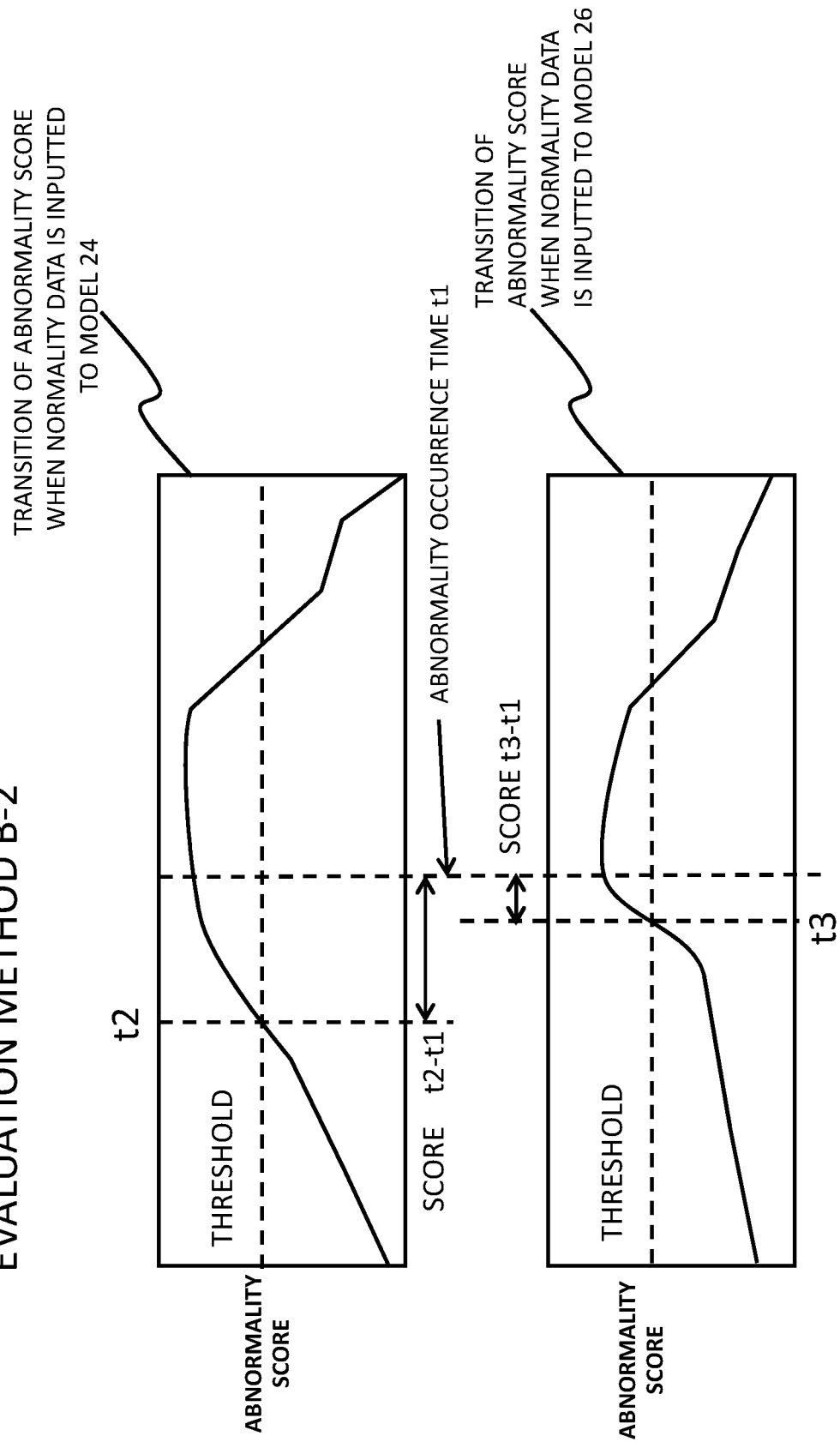
FIG. 12 illustrates an example of a system model candidate evaluation method used by the system model evaluation system according to the first exemplary embodiment of the present disclosure.

Next, the system model candidate evaluation part 113 calculates an evaluation value for an individual one of the second system models that have accurately detected the abnormality and determines the second system model corresponding to the best evaluation value. FIG. 12 illustrates a specific example of the evaluation method B-2. Specifically, FIG. 12 illustrates abnormality determination timing obtained by inputting abnormality data to the second system models 24 and 26 and using a predetermined monitoring item. In the example in FIG. 12, the second system model 24 has detected occurrence of an abnormality at time t2. In contrast, the second system model 26 has detected occurrence of the abnormality at time t3. In this case, the difference between abnormality occurrence time t1, detected from data obtained when the original abnormality has occurred, and t2/t3 may be used as the evaluation value of the corresponding candidate of the system model (in FIG. 12, a system model having the shorter two-way arrow is the better system model). While not illustrated in FIG. 12, the evaluation method B-2 on the second system models 22 and 23 is also performed in the same way.

The system model candidate evaluation part 113 may be configured to finally calculate an evaluation value obtained by synthesizing the evaluation values illustrated in FIGS. 9 to 12. For example, an evaluation value obtained in view of the size of the noise illustrated in FIG. 10 and an evaluation value obtained in view of the accuracy (accuracy level) of the abnormality detection illustrated in FIG. 12 are each normalized, and the evaluation values are added to calculate an evaluation value. In addition, there are cases in which no abnormality data is available. Thus, in such cases, by using an evaluation value obtained in view of the size of the noise illustrated in FIG. 10, a system model to be adopted may be determined.

Figure 13:
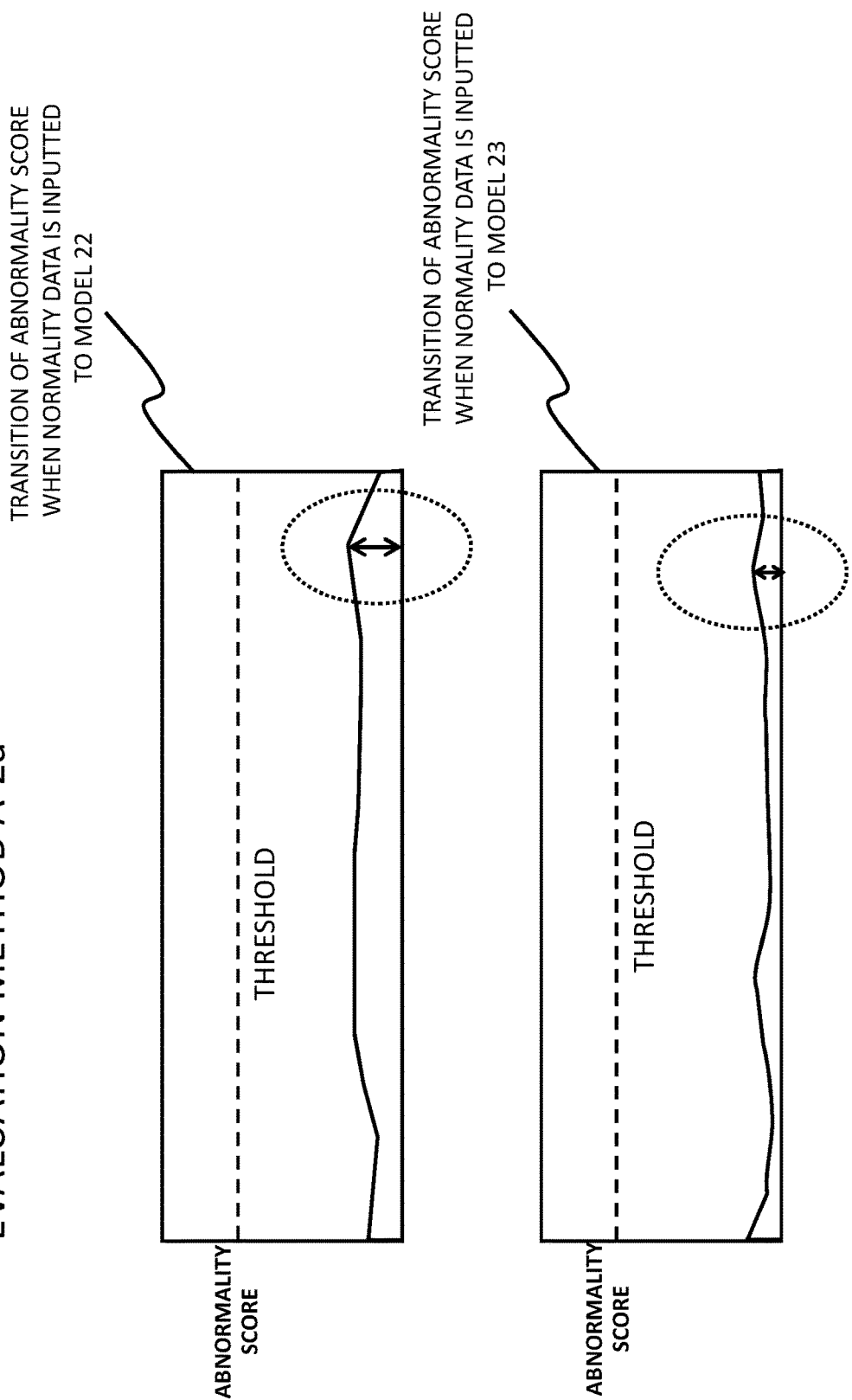
FIG. 13 illustrates an example of a system model candidate evaluation method used by the system model evaluation system according to the first exemplary embodiment of the present disclosure.

The above evaluation methods are only examples, and various variations can be made. For example, instead of the evaluation method using the area of the region indicating the noise illustrated in FIG. 10, as illustrated in FIG. 13, the evaluation can be performed by using the size of the maximum value of the noise. Likewise, in the case of the method illustrated in FIG. 12, there are cases in which some abnormality detection timing is earlier than the actual occurrence of the abnormality and other abnormality detection timing is later than the actual occurrence of the abnormality. In these cases, even when the scores, each indicating a shift amount from the actual abnormality detection timing, are the same values, the evaluation value for a candidate whose abnormality detection timing is later than the actual occurrence of the abnormality may be lowered, for example.

As described above, according to the present exemplary embodiment, a more accurate system model can be adopted from a plurality of candidates of the system model. In this way, it is possible to improve the detection accuracy of a sign(s) of a malfunction(s) and the capability of determining the occurrence location(s) in the target operation management system.

Second Exemplary Embodiment

Next, a second exemplary embodiment which assumes that apparatuses having a redundant configuration are included in a management target system will be described. Since the first and second exemplary embodiments share the same basic configuration and operation, the following description will be made with a focus on the difference between these exemplary embodiments.

Figure 14:
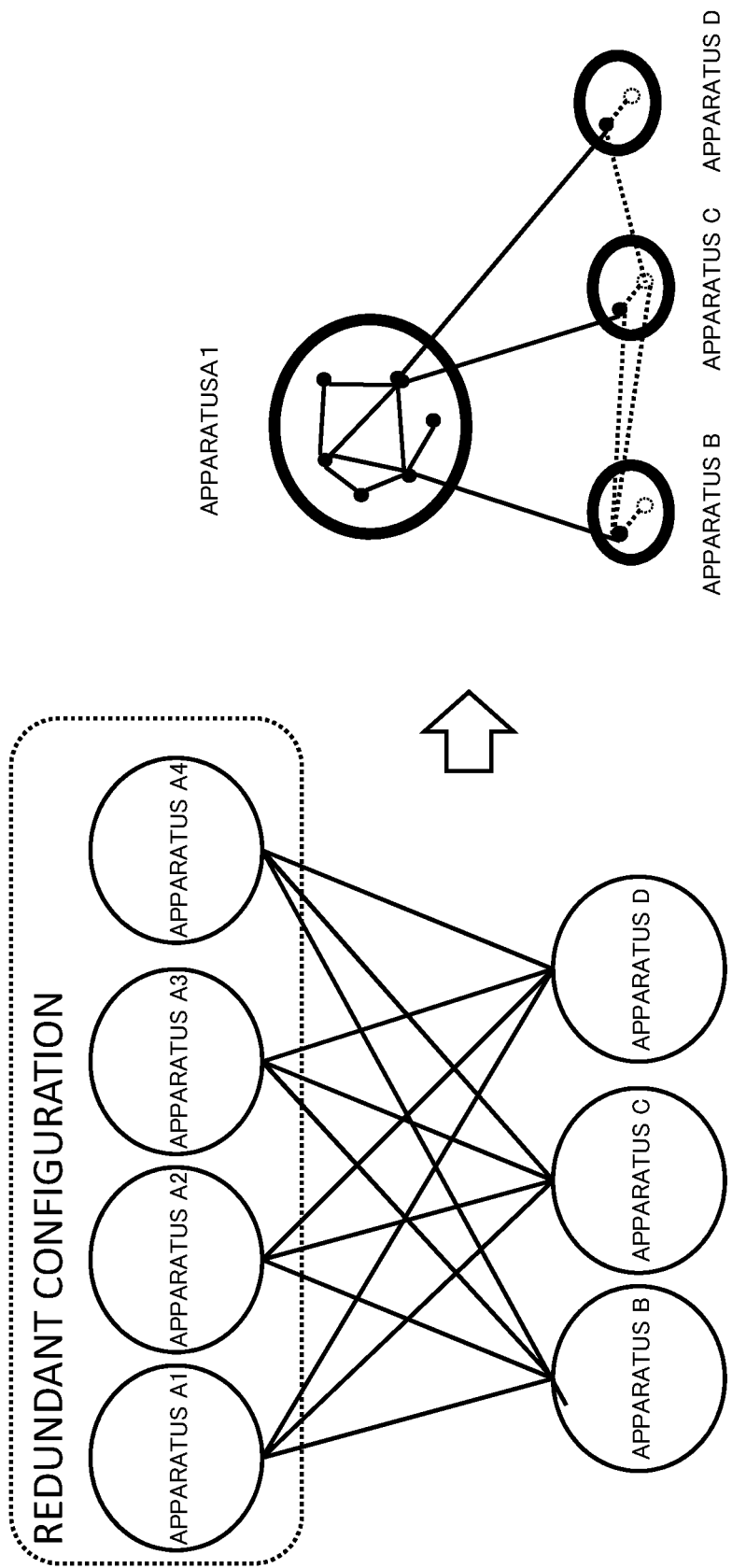
FIG. 14 illustrates an example of apparatuses having a redundant configuration included in a system model evaluation system according to a second exemplary embodiment of the present disclosure and an example of a generated candidate of a system model.

As illustrated on the left side in FIG. 14, there are cases in which apparatuses A1 to A4 have a redundant configuration among the apparatuses in a management target system. In this case, to create and evaluate a system model, it is necessary to take the redundant configuration into consideration. For example, when a system model including the apparatus A1 is established, the apparatuses A2 to A4, which form the redundant configuration with the apparatus A1, are not included in the candidates of the system model (the candidates of the second system model), and the candidates without these apparatuses A2 to A4 are evaluated.

FIG. 15 illustrates an example of system configuration information held in the system configuration storage part 115 in the system model evaluation system according to the second exemplary embodiment. This table differs from the table holding apparatus information illustrated in FIG. 5 in that redundant configuration information about the apparatuses having the redundant configuration can be stored. For example, in FIG. 15, the apparatus A1 has the redundant configuration with the apparatuses A2 to A4.

In this case, when the system model candidate creation part 112 in the system model evaluation system creates a system model including a certain apparatus, the system model candidate creation part 112 creates the system model without the sensors in the apparatuses having a redundant configuration with the certain apparatus. For example, when creating the candidates of a system model including the apparatus A1, the system model candidate creation part 112 creates a system model without the sensors in the apparatuses A2 to A4.

As described above, according to the present exemplary embodiment, even when the apparatuses in a management target system have a redundant configuration, a system model having less noise due to the apparatuses having the redundant configuration can be established.

Third Exemplary Embodiment

Next, a third exemplary embodiment in which the candidate generation rules used by the system model candidate creation part 112 are different will be described. Since the first and third exemplary embodiments also share the same basic configuration and operation, the following description will be made with a focus on the difference between these exemplary embodiments.

Figure 16:
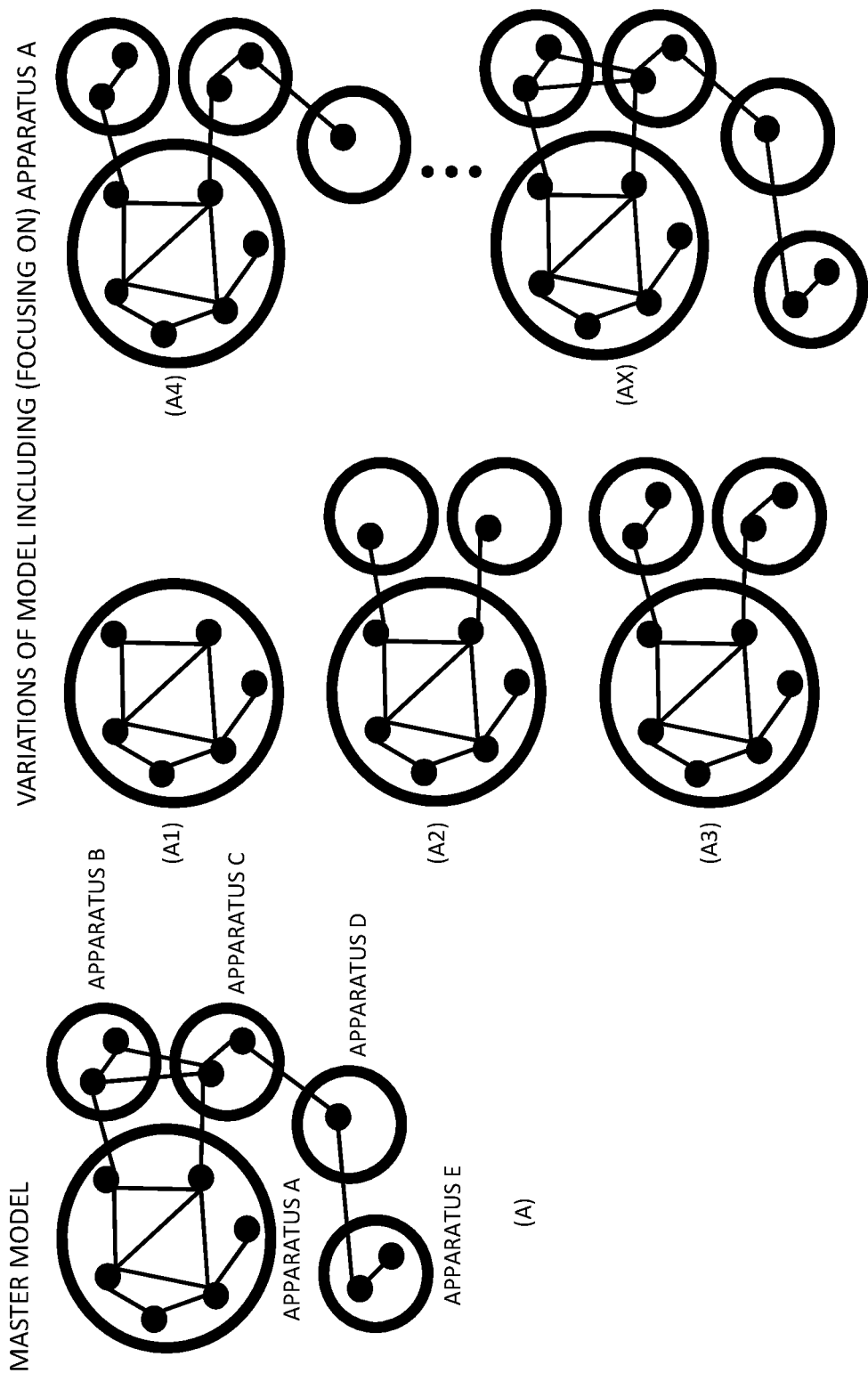
FIG. 16 illustrates an example of system model candidates generated by a system model evaluation system according to a third exemplary embodiment of the present disclosure.

The master model on the left side in FIG. 16 corresponds to the first system model stored in the system model storage part according to the first exemplary embodiment and represents a system model formed by the apparatuses A to E.

According to the present exemplary embodiment, as in the first exemplary embodiment, first, the system model candidate creation part 112 selects, for example, the apparatus A and creates the candidates of the second system model. For example, (A1) in FIG. 16 illustrates a candidate of the system model created by using a relationship among the sensors arranged in the apparatus A. Likewise, (A2) in FIG. 16 illustrates a candidate of the system model created by using the sensors arranged in the apparatus A and sensors related to these sensors. Likewise, (A3) in FIG. 16 illustrates a candidate of the system model created by using the sensors arranged in the apparatus A and the sensors in the apparatuses having the above sensors related to the above sensors in the apparatus A. Likewise, (A4) in FIG. 16 illustrates a candidate of the system model created by using the sensors arranged in the apparatus A, the sensors in the apparatuses B and C having the above sensors related to the above sensors arranged in the apparatus A, and a sensor in the apparatus D related to one of the sensors in the apparatus C. (AX) in FIG. 16 illustrates a system model including all the constituent elements in the apparatuses directly or indirectly related to the target apparatus. The operation described so far is the same as that according to the first exemplary embodiment in which the candidate generation rules illustrated in FIG. 6 are used.

According to the present exemplary embodiment, as described above, after the candidates of the second system model are created, the system model candidate creation part 112 performs pruning processing on links (relationships) in the system model while focusing on an individual relationship between apparatuses. An example of the relationship between apparatuses is a physical connection relationship between the apparatuses. Namely, the relationship is a relationship in which an output from an apparatus is used as an input to another apparatus, for example. FIG. 17 illustrates an example of the pruning processing performed by the system model candidate creation part 112 according to the present exemplary embodiment. For example, as illustrated in the bottom left corner in FIG. 17, when apparatuses A to E are connected in series in this order, the system model candidate creation part 112 removes the links to the apparatuses C and D, which are not connected to the apparatus A, from the system models, as illustrated in (A2) to (AX) in FIG. 17. In the example in FIG. 17, the link between the apparatuses A and C and all the links in the apparatus C are removed from the system model candidate (A3). From the system model candidate (A4), the link between the apparatuses C and D is removed, in addition to the above links. From the system model candidate (AX), in addition to the above links, the link between the apparatuses B and C is removed. As a result, the system model candidates (A3) to (AX) become the same system model candidate. Of course, the system model candidates (A4) and (AX) may be removed.

As described above, it is possible to create the candidates of the second system model by focusing on an individual relationship between apparatuses. In this way, since a system model is configured from intuitively understandable relationships alone, a person can evaluate the system model by observing the relationships in the system model in addition to the evaluation results obtained from the system model candidate evaluation part.

Fourth Exemplary Embodiment

Next, a fourth exemplary embodiment in which the candidate generation rules used by the system model candidate creation part 112 are different. Since the first and fourth exemplary embodiments also share the same basic configuration and operation, the following description will be made with a focus on the difference between these exemplary embodiments.

Figure 18:
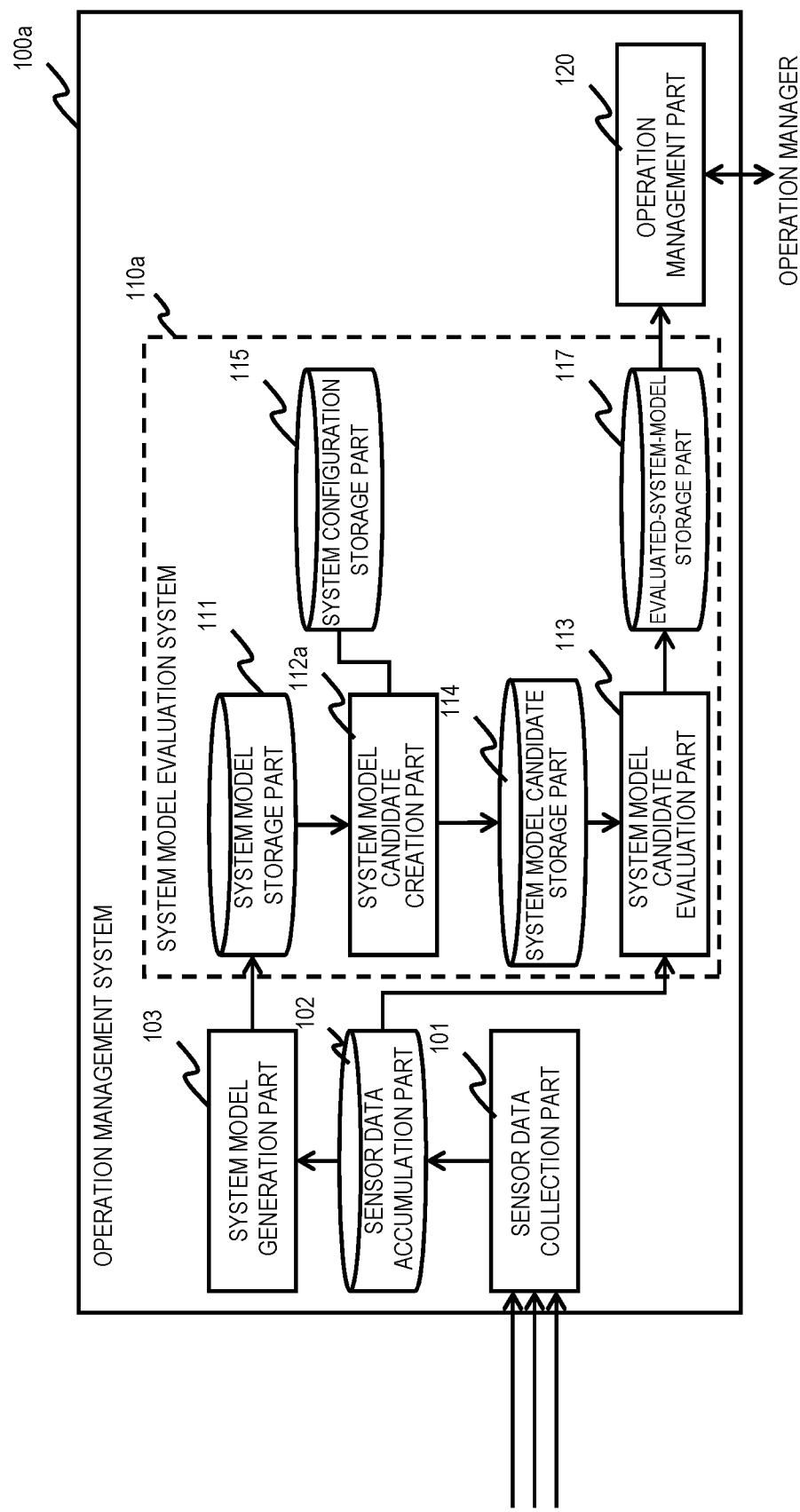
FIG. 18 illustrates a configuration of an operation management system according to a fourth exemplary embodiment of the present disclosure.

FIG. 18 illustrates a configuration of an operation management system according to a fourth exemplary embodiment of the present disclosure. This operation management system differs from that according to the first exemplary embodiment illustrated in FIG. 2 in that the candidate generation rule storage part 116 in the system model evaluation system is omitted.

Figure 19:
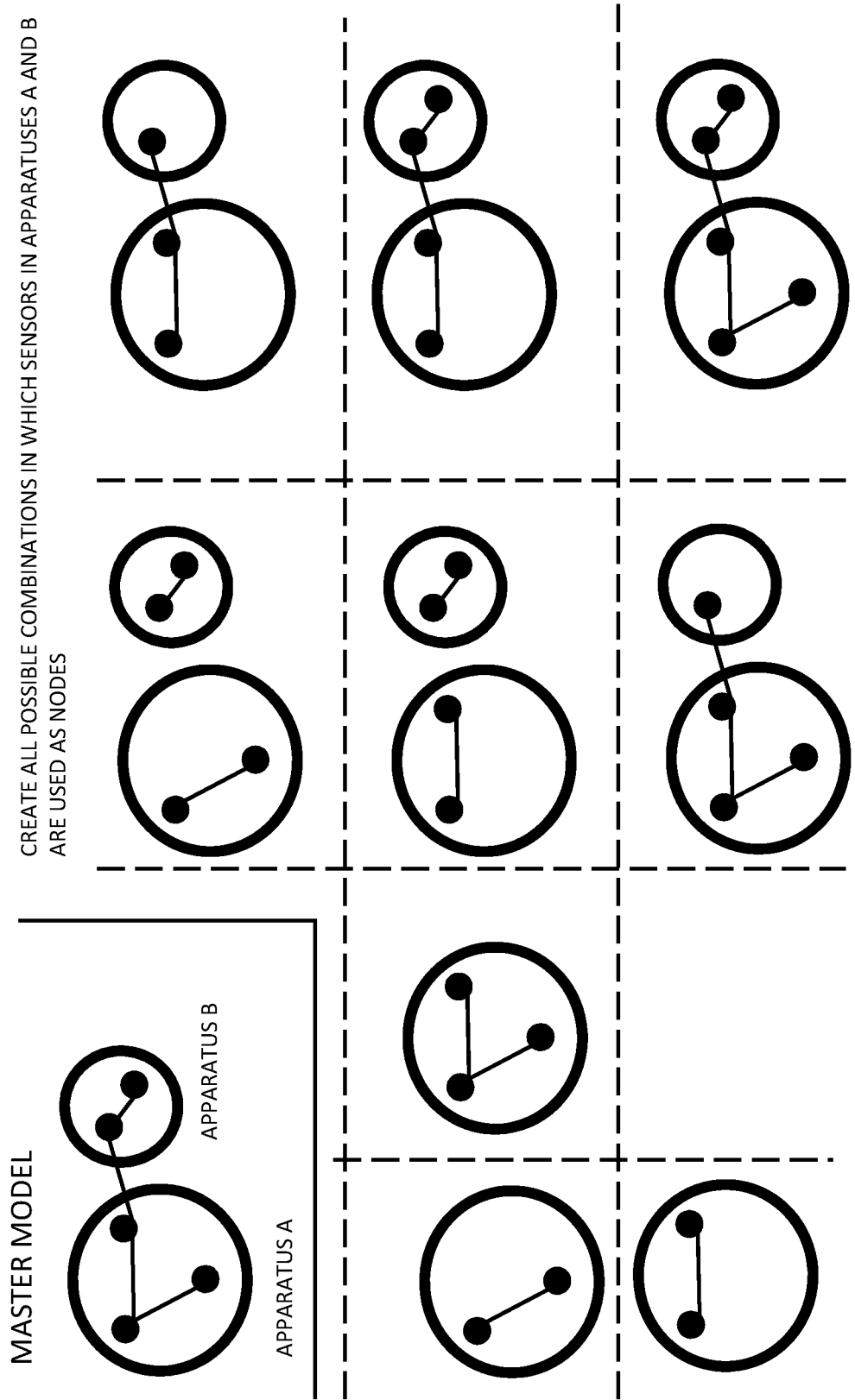
FIG. 19 illustrates an example of system model candidates generated by a system model evaluation system according to the fourth exemplary embodiment of the present disclosure.

The master model in the top left corner in FIG. 19 corresponds to the first system model stored in the system model storage part 111 in FIG. 18 and represents a system model formed by the apparatuses A and B. In addition, according to the present exemplary embodiment, a system model candidate creation part 112*a* creates all patterns, each of which has a sensor(s) as a node(s) in the apparatus A and a link(s) connecting nodes, and uses these patterns as the candidates of the second system model. By causing the system model candidate creation part 112*a* to repeat the above operation on all the apparatuses, all the second system model candidates inside the target system can be extracted.

In this way, the candidates of the second system model can be created by using an algorithm that selects arbitrary apparatuses and nodes (sensors) therein without using the rules illustrated in FIG. 6 and comprehensively searching for possible links while increasing the number of links one by one.

Fifth Exemplary Embodiment

Next, a fifth exemplary embodiment in which the evaluation method used by the system model candidate evaluation part 113 is different will be described. Since the first and fifth exemplary embodiments also share the same basic configuration and operation, the following description will be made with a focus on the difference between these exemplary embodiments.

Figure 21:
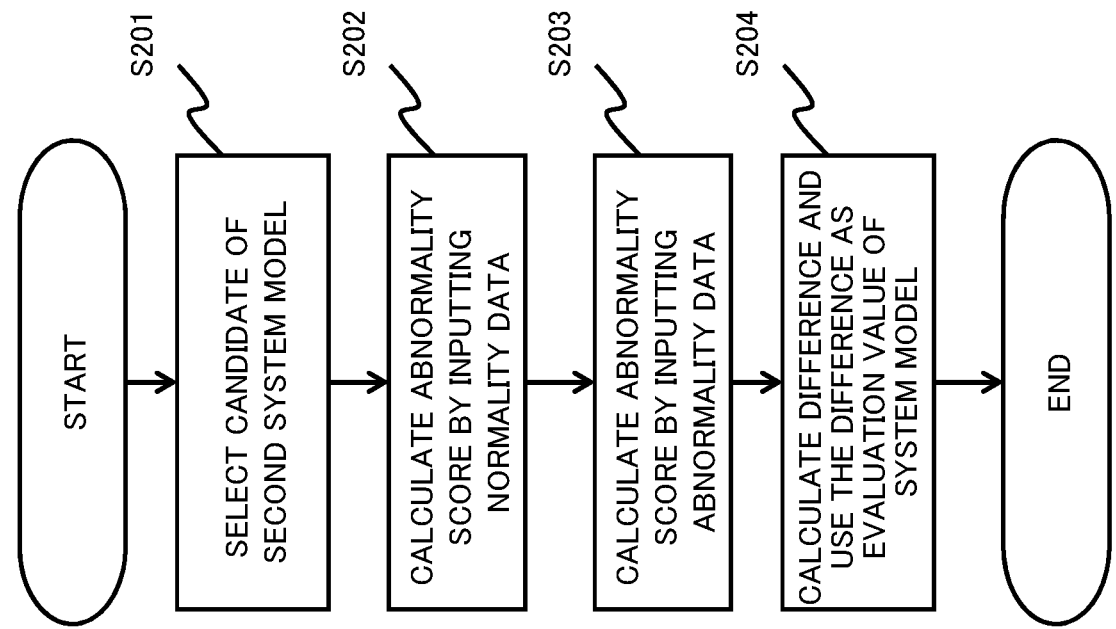
FIG. 21 illustrates an example of the processing flow of the evaluation of a system model candidate in a system model evaluation system according to a fifth exemplary embodiment of the present disclosure.

FIG. 21 illustrates an example of the processing flow of the evaluation of a system model candidate in a system model evaluation system according to a fifth exemplary embodiment of the present disclosure. In the evaluation of the system model candidates according to the first exemplary embodiment illustrated in S002 in FIG. 8, the following processing is performed according to the fifth exemplary embodiment. First, the system model candidate evaluation part 113 selects a candidate of the system model (a candidate of the second system model) to be evaluated from the system model candidate storage part 114 (step S201).

Next, the system model candidate evaluation part 113 inputs normality data to the selected candidate of the system model (the candidate of the second system model) and calculates an abnormality score (step S202).

Next, the system model candidate evaluation part 113 inputs abnormality data to the selected candidate of the system model (the candidate of the second system model) and calculates an abnormality score (step S203).

Next, the system model candidate evaluation part 113 calculates the difference between the abnormality score obtained by inputting the normality data and the abnormality score obtained by inputting the abnormality data (step S204). Examples of the method for calculating this difference includes a method for calculating the difference between the maximum values (peak values) of the abnormality scores (this will be referred to as "difference calculation method 1"), a method for calculating the difference between the average values of the abnormality scores (this will be referred to as "difference calculation method 2"), and a method for calculating a difference value by combining these methods. Another example is a method for calculating the difference between a maximum value of an abnormality score obtained by inputting the normality data and a minimum value of an abnormality score obtained by inputting the abnormality data (this will be referred to as "difference calculation method 3").

FIG. 22 illustrates a method for evaluating the candidates of a second system model in accordance with the above procedure when difference calculation method 1 is adopted. FIG. 22 illustrates waveforms of abnormality scores obtained by inputting the same normality data and abnormality data to second system model candidates 31 and 32. In the case of the second system model candidate 31 in the upper graphs in FIG. 22, a difference d1 between the maximum values (peak values) of the abnormality scores is large. In contrast, in the case of the second system model candidate 32 in the lower graphs in FIG. 22, a difference d2 between the maximum values (peak values) of the abnormality scores is smaller than the difference d1. Namely, FIG. 22 indicates that the detection performance of the second system model candidate 31 for determining the normality data to be normal and the abnormality data to be abnormal is better than that of the second system model candidate 32. In contrast, FIG. 22 indicates that the second system model candidate 32 cannot clearly determine, when receiving the normality data and the abnormality data, the normality data and the abnormality data to be normal and abnormal, respectively. In the example in FIG. 22, the evaluation is performed by using the difference between the maximum values (peak values) of the abnormality scores. However, alternatively, the evaluation may be performed by various methods, such as by comparing the average values of the abnormality scores and by using how the abnormality scores are different from the normality data and the abnormality data.

In this way, according to the present exemplary embodiment, the candidates of the second system model can be evaluated easily. A comprehensive evaluation may be performed on the candidates of the second system model in the fifth exemplary embodiment, by performing the evaluation methods according to the first exemplary embodiment illustrated in FIGS. 9 to 12.

While exemplary embodiments of the present disclosure have thus been described, the present disclosure is not limited thereto. Further variations, substitutions, or adjustments can be made without departing from the basic technical concept of the present disclosure. For example, the configurations of the networks, the configurations of the elements, and the representation modes of the messages illustrated in the drawings have been used only as examples to facilitate understanding of the present disclosure. Namely, the present disclosure is not limited to the configurations illustrated in the drawings. For example, the present disclosure is applicable to establishment of system models of various kinds of systems such as for plants, data centers, and communication systems.

Finally, suitable modes of the present disclosure will be summarized.

[Mode 1]

(See the system model evaluation system according to the above first aspect)

[Mode 2]

The system model evaluation system according to mode 1; wherein the system model candidate creation part creates a candidate(s) of the system model by using an inter-sensor-value relationship created by using sensor values acquired from sensors arranged in one selected target apparatus included in the system and an inter-sensor-value relationship created by using a sensor value(s) acquired from a sensor(s) arranged in the target apparatus and a sensor value(s) acquired from a sensor(s) arranged in a related apparatus that relates to the target apparatus.

[Mode 3]

The system model evaluation system according to mode 2; wherein the system model candidate creation part further creates a candidate(s) of the system model by using an inter-sensor-value relationship created by using sensor values acquired from sensors arranged in the related apparatus.

[Mode 4]

The system model evaluation system according to any one of modes 1 to 3, further comprising: a storage storing an apparatus(es) having a redundant configuration included in a system to which a system model is directed;

wherein, when creating a candidate(s) of the system model including an apparatus having the redundant configuration, the system model evaluation part creates the candidate(s) of the system model in such a manner that a different apparatus(es) having the redundant configuration is not included.

[Mode 5]

The system model evaluation system according to any one of modes 1 to 4; wherein the system model candidate creation part performs processing for removing an inter-sensor-value relationship(s) from the generated candidate(s) of the system model based on a relationship(s) between (among) apparatuses included in the system.

[Mode 6]

The system model evaluation system according to any one of modes 1 to 5; wherein the system model candidate creation part comprehensively creates a candidate of the system model having an inter-sensor-value relationship(s) created by using sensor values acquired from sensors arranged in one selected apparatus included in the system.

[Mode 7]

The system model evaluation system according to any one of modes 1 to 6; wherein the system model evaluation part compares an output(s) obtained by inputting the predetermined evaluation data to a candidate(s) of the system model with a predetermined threshold and checks whether the candidate(s) of the system model can determine an abnormal state or a normal state of the system.

[Mode 8]

The system model evaluation system according to any one of modes 1 to 7; wherein the system model evaluation part evaluates a candidate(s) of the system model by using a difference(s) between an output(s) obtained by inputting normality data to the candidate(s) of the system model and an output(s) obtained by inputting abnormality data to the candidate(s) of the system model.

[Mode 9]

The system model evaluation system according to any one of modes 1 to 8; wherein the system model evaluation part calculates an evaluation value(s) of a candidate(s) of the system model by calculating noise included in an output(s) obtained by inputting the predetermined evaluation data to the candidate(s) of the system model.

[Mode 10]

The system model evaluation system according to any one of modes 1 to 9; wherein the system model evaluation part calculates an evaluation value(s) of a candidate(s) of the system model by calculating an accuracy level(s) of abnormality determination timing obtained by inputting the predetermined evaluation data to the candidate(s) of the system model.

[Mode 11]

(See the operation management system according to the above second aspect)

[Mode 12]

(See the system model evaluation method according to the above third aspect)

[Mode 13]

(See the program according to the above fourth aspect)

The above modes 11 and 13 can be expanded in the same way as mode 1 is expanded to modes 2 to 10.

The disclosure of each of the above Patent Literatures is incorporated herein by reference thereto. Variations and adjustments of the exemplary embodiments and the examples are possible within the scope of the overall disclosure (including the claims) of the present invention and based on the basic technical concept of the present invention. Various combinations and selections of various disclosed elements (including the elements in the claims, exemplary embodiments, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

What is claimed is:

1. A system model evaluation system, comprising:
a system model candidate creation part configured to create a candidate(s) of a system model by changing a pattern of selecting an inter-sensor-value relationship created by using sensor values acquired from sensors arranged in a system to which the system model is directed;
a system model evaluation part configured to evaluate the candidate(s) of the system model by inputting predetermined evaluation data to the created candidate(s) of the system model; and
a storage storing information about an apparatus(es) having a redundant configuration included in a system to which a system model is directed,
wherein, when creating a candidate(s) of the system model including an apparatus having the redundant configuration, the system model evaluation part creates the candidate(s) of the system model in such a manner that a different apparatus(es) having the redundant configuration is not included.

2. The system model evaluation system according to claim 1; wherein the system model candidate creation part creates a candidate(s) of the system model by using an inter-sensor-value relationship created by using sensor value(s) acquired from sensor(s) arranged in one selected target apparatus included in the system and an inter-sensor-value relationship created by using a sensor value(s) acquired from a sensor(s) arranged in the target apparatus and a sensor value(s) acquired from a sensor(s) arranged in a related apparatus that relates to the target apparatus.

3. The system model evaluation system according to claim 2; wherein the system model candidate creation part further creates a candidate(s) of the system model by using an inter-sensor-value relationship created by using sensor values acquired from sensors arranged in the related apparatus.

4. The system model evaluation system according to claim 1; wherein the system model candidate creation part performs processing for removing an inter-sensor-value relationship(s) from the generated candidate(s) of the system model based on a relationship(s) between (among) apparatuses included in the system.

5. The system model evaluation system according to claim 1; wherein the system model candidate creation part comprehensively creates a candidate of the system model having at least one inter-sensor-value relationship created by using sensor values acquired from sensors arranged in one selected apparatus included in the system.

6. The system model evaluation system according to claim 1; wherein the system model evaluation part compares an output(s) obtained by inputting the predetermined evaluation data to a candidate(s) of the system model with a predetermined threshold and checks whether or not the candidate(s) of the system model can determine an abnormal state or a normal state of the system.

7. The system model evaluation system according to claim 1; wherein the system model evaluation part evaluates a candidate(s) of the system model by using a difference(s) between an output(s) obtained by inputting normality data to the candidate(s) of the system model and an output(s) obtained by inputting abnormality data to the candidate(s) of the system model.

8. The system model evaluation system according to claim 1; wherein the system model evaluation part calculates an evaluation value(s) of a candidate(s) of the system model by calculating noise included in an output(s) obtained by inputting the predetermined evaluation data to the candidate(s) of the system model.

9. The system model evaluation system according to claim 1; wherein the system model evaluation part calculates an evaluation value(s) of a candidate(s) of the system model by calculating an accuracy level(s) of abnormality determination timing obtained by inputting the predetermined evaluation data to the candidate(s) of the system model.

10. An operation management system, performing operation management on a target system by using a system model evaluated by the system model evaluation system according to claim 1.

11. A system model evaluation method, comprising:
creating a candidate(s) of a system model by changing a pattern of selecting an inter-sensor-value relationship created by using sensor value(s) acquired from sensor(s) arranged in a system to which the system model is directed;
evaluating the candidate(s) of the system model by inputting predetermined evaluation data to the created candidate(s) of the system model;
referring to a storage storing information about an apparatus(es) having a redundant configuration included in a system to which a system model is directed; and
creating, when creating a candidate(s) of the system model for an apparatus having the redundant configuration, the candidate(s) of the system model in such a manner that the other apparatus(es) having the redundant configuration is not included.

12. The system model evaluation method according to claim 11, comprising creating a candidate(s) of the system model by using an inter-sensor-value relationship created by using sensor value(s) acquired from sensor(s) arranged in one selected target apparatus included in the system and an inter-sensor-value relationship created by using a sensor value(s) acquired from a sensor(s) arranged in the target apparatus and a sensor value(s) acquired from a sensor(s) arranged in a related apparatus that relates to the target apparatus.

13. The system model evaluation method according to 12, further comprising creating a candidate(s) of the system model by using an inter-sensor-value relationship created by using sensor value(s) acquired from sensor(s) arranged in the related apparatus.

14. The system model evaluation method according to claim 11, comprising:
referring to a storage storing an apparatus(es) having a redundant configuration included in a system to which a system model is directed; and
creating, when creating a candidate(s) of the system model for an apparatus having the redundant configuration, the candidate(s) of the system model in such a manner that the other apparatus(es) having the redundant configuration is not included.

15. The system model evaluation method according to claim 11, comprising evaluating a candidate(s) of the system model by using a difference between an output(s) obtained by inputting normality data to the candidate(s) of the system model and an output(s) obtained by inputting abnormality data to the candidate(s) of the system model.

16. A non-transitory computer-readable recording medium storing thereon a program, causing a computer, which includes a system model storage part that stores a system model configured by an inter-sensor-value relationship created by using sensor value(s) acquired from sensor(s) arranged in a system to which a system model is directed, to perform processing for:
creating a candidate(s) of the system model by changing a pattern of selecting an inter-sensor-value relationship created by using sensor value(s) acquired from sensor(s) arranged in the system to which the system model is directed;
evaluating the candidate(s) of the system model by inputting predetermined evaluation data to the created candidate(s) of the system model;
referring to a storage storing information about an apparatus(es) having a redundant configuration included in a system to which a system model is directed; and
creating, when creating a candidate(s) of the system model for an apparatus having the redundant configuration, the candidate(s) of the system model in such a manner that the other apparatus(es) having the redundant configuration is not included.

17. The system model evaluation system according to claim 2, further comprising:
a storage storing an apparatus(es) having a redundant configuration included in a system to which a system model is directed;
wherein, when creating a candidate(s) of the system model including an apparatus having the redundant configuration, the system model evaluation part creates the candidate(s) of the system model in such a manner that a different apparatus(es) having the redundant configuration is not included.

18. The system model evaluation system according to claim 3, further comprising:
a storage storing an apparatus(es) having a redundant configuration included in a system to which a system model is directed;
wherein, when creating a candidate(s) of the system model including an apparatus having the redundant configuration, the system model evaluation part creates the candidate(s) of the system model in such a manner that a different apparatus(es) having the redundant configuration is not included.

19. The system model evaluation system according to claim 2; wherein the system model candidate creation part performs processing for removing an inter-sensor-value relationship(s) from the generated candidate(s) of the system model based on a relationship(s) between (among) apparatuses included in the system.

* * * * *